(12) United States Patent
Xiang et al.

(10) Patent No.: US 9,286,898 B2
(45) Date of Patent: Mar. 15, 2016

(54) METHODS AND APPARATUSES FOR PROVIDING TANGIBLE CONTROL OF SOUND

(71) Applicant: QUALCOMM Incorporated, San Diego, CA (US)

(72) Inventors: Pei Xiang, San Diego, CA (US); Kexi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 13/725,973

(22) Filed: Dec. 21, 2012

(65) Prior Publication Data

US 2014/0136981 A1    May 15, 2014

Related U.S. Application Data

(60) Provisional application No. 61/726,451, filed on Nov. 14, 2012, provisional application No. 61/726,456, filed on Nov. 14, 2012, provisional application No. 61/726,441, filed on Nov. 14, 2012, provisional application No. 61/726,461, filed on Nov. 14, 2012.

(51) Int. Cl.
*G10L 17/00* (2013.01)
*H04R 29/00* (2006.01)
(Continued)

(52) U.S. Cl.
CPC ............. *G10L 17/00* (2013.01); *G06F 3/167* (2013.01); *H04R 3/005* (2013.01); *H04R 29/002* (2013.01);
(Continued)

(58) Field of Classification Search
CPC .......... G06F 3/167; G06F 3/16; G06F 3/0485

USPC ......................................................... 715/728
See application file for complete search history.

(56) References Cited

U.S. PATENT DOCUMENTS 4,731,848 A    3/1988 Kendall et al.
5,666,136 A    9/1997 Fujishita et al.
(Continued)

FOREIGN PATENT DOCUMENTS

EP    2031418 A1    3/2009
WO    2008051661 A1    5/2008
(Continued)

OTHER PUBLICATIONS

International Preliminary Report on Patentability from International Application No. PCT/US2013/064708, dated Jan. 30, 2015, 6 pp.
(Continued)

*Primary Examiner* — Andrea Leggett
(74) *Attorney, Agent, or Firm* — Shumaker & Sieffert, P.A.

(57) ABSTRACT

Methods and apparatuses for providing tangible control of sound are provided and described as embodied in a system that includes a sound transducer array along with a touch surface-enabled display table. The array may include a group of transducers (multiple speakers and/or microphones) configured to perform spatial processing of signals for the group of transducers so that sound rendering (in configurations where the array includes multiple speakers), or sound pick-up (in configurations where the array includes multiple microphones), have spatial patterns (or sound projection patterns) that are focused in certain directions while reducing disturbances from other directions. Users may directly adjust parameters related to sound projection patterns by interacting with the touch surface while receiving visual feedback by exercising one or more commands on the touch surface. The commands may be adjusted according to visual feedback received from the change of the display on the touch surface.

68 Claims, 21 Drawing Sheets

(51) Int. Cl.
*G06F 3/16* (2006.01)
*H04R 3/00* (2006.01)
*H04S 7/00* (2006.01)
*G06F 3/0485* (2013.01)

(52) U.S. Cl.
CPC . *H04S 7/303* (2013.01); *H04S 7/40* (2013.01); *G06F 3/0485* (2013.01); *G10H 2210/301* (2013.01); *G10H 2220/096* (2013.01); *G10H 2220/355* (2013.01)

(56) References Cited

U.S. PATENT DOCUMENTS

| | | | |
|---|---|---|---|
| 5,839,109 | A | 11/1998 | Iwamida |
| 6,545,669 | B1 | 4/2003 | Kinawi et al. |
| 6,826,284 | B1 | 11/2004 | Benesty et al. |
| 6,850,496 | B1 | 2/2005 | Knappe et al. |
| 7,778,739 | B2 | 8/2010 | Preston et al. |
| 7,843,486 | B1 | 11/2010 | Blair et al. |
| 7,920,158 | B1 | 4/2011 | Beck et al. |
| 7,995,732 | B2 | 8/2011 | Koch et al. |
| 8,045,736 | B2 | 10/2011 | Shibata et al. |
| 8,050,917 | B2 | 11/2011 | Caspi et al. |
| 8,174,934 | B2 | 5/2012 | Li et al. |
| 8,676,581 | B2 | 3/2014 | Flaks et al. |
| 8,744,065 | B2 | 6/2014 | Edholm et al. |
| 2003/0006965 | A1 | 1/2003 | Bohn |
| 2003/0217871 | A1 | 11/2003 | Chao et al. |
| 2004/0013252 | A1 | 1/2004 | Craner |
| 2004/0080494 | A1 | 4/2004 | Fahlman |
| 2004/0125942 | A1 | 7/2004 | Beaucoup et al. |
| 2005/0135583 | A1 | 6/2005 | Kardos |
| 2006/0238495 | A1 | 10/2006 | Davis |
| 2006/0268930 | A1* | 11/2006 | Preston et al. ................. 370/466 |
| 2007/0075968 | A1 | 4/2007 | Hall et al. |
| 2007/0195012 | A1 | 8/2007 | Ichikawa et al. |
| 2007/0217590 | A1 | 9/2007 | Loupia et al. |
| 2008/0019531 | A1 | 1/2008 | Kimijima |
| 2008/0101624 | A1 | 5/2008 | Schentrup et al. |
| 2008/0252595 | A1 | 10/2008 | Boillot |
| 2008/0253592 | A1* | 10/2008 | Sanders et al. ................. 381/306 |
| 2008/0255901 | A1 | 10/2008 | Carroll et al. |
| 2008/0259731 | A1 | 10/2008 | Happonen |
| 2009/0015594 | A1 | 1/2009 | Baba |
| 2009/0080632 | A1 | 3/2009 | Zhang et al. |
| 2009/0214052 | A1 | 8/2009 | Liu et al. |
| 2009/0299745 | A1 | 12/2009 | Kennewick et al. |
| 2010/0020951 | A1* | 1/2010 | Basart et al. ............. 379/142.01 |
| 2010/0157726 | A1 | 6/2010 | Ando et al. |
| 2010/0302401 | A1 | 12/2010 | Oku et al. |
| 2010/0303247 | A1 | 12/2010 | Sinivaara |
| 2010/0323652 | A1 | 12/2010 | Visser et al. |
| 2011/0013075 | A1 | 1/2011 | Kim et al. |
| 2011/0025635 | A1 | 2/2011 | Lee |
| 2011/0025916 | A1 | 2/2011 | Kohara et al. |
| 2011/0096941 | A1 | 4/2011 | Marzetta et al. |
| 2011/0109937 | A1 | 5/2011 | Fujiki et al. |
| 2011/0304632 | A1 | 12/2011 | Evertt et al. |
| 2012/0022924 | A1 | 1/2012 | Runnels et al. |
| 2012/0041579 | A1 | 2/2012 | Davis et al. |
| 2012/0052972 | A1 | 3/2012 | Bentley |
| 2012/0068964 | A1 | 3/2012 | Wright et al. |
| 2012/0069986 | A1* | 3/2012 | Edholm et al. ........... 379/265.06 |
| 2012/0086631 | A1 | 4/2012 | Osman et al. |
| 2012/0124602 | A1 | 5/2012 | Tan et al. |
| 2012/0163610 | A1 | 6/2012 | Sakagami |
| 2012/0176467 | A1 | 7/2012 | Kenoyer |
| 2012/0182429 | A1 | 7/2012 | Forutanpour et al. |
| 2012/0262536 | A1 | 10/2012 | Chen et al. |
| 2012/0297400 | A1 | 11/2012 | Hill et al. |
| 2012/0316869 | A1 | 12/2012 | Xiang et al. |
| 2013/0144629 | A1 | 6/2013 | Johnston et al. |
| 2013/0156220 | A1 | 6/2013 | Bar-Zeev et al. |
| 2013/0259254 | A1 | 10/2013 | Xiang et al. |
| 2013/0278499 | A1 | 10/2013 | Anderson |
| 2014/0133665 | A1 | 5/2014 | Xiang et al. |
| 2014/0136203 | A1 | 5/2014 | Liu et al. |
| 2014/0136981 | A1 | 5/2014 | Xiang et al. |
| 2014/0198029 | A1 | 7/2014 | Dang et al. |

FOREIGN PATENT DOCUMENTS

| | | | |
|---|---|---|---|
| WO | 2011076286 | A1 | 6/2011 |
| WO | 2011076290 | A1 | 6/2011 |

OTHER PUBLICATIONS

International Search Report and Written Opinion from International Application No. PCT/US2013/064708, dated Jan. 23, 2014, 10 pp.
Second Written Opinion from International Application No. PCT/US2013/064708, dated Oct. 22, 2014, 5 pp.

* cited by examiner

*Top View*

*Top View*

Top View

Top View

Top View

Top View

Top View

*Top View*

METHODS AND APPARATUSES FOR PROVIDING TANGIBLE CONTROL OF SOUND

CLAIM OF PRIORITY UNDER 35 U.S.C. §119(E)

The present application for patent claims priority to and benefit of U.S. Provisional Application No. 61/726,451, entitled "Device and System for Refreshing a Sound Field in a Physical Space" filed Nov. 14, 2012, U.S. Provisional Application No. 61/726,456, entitled "Method and Apparatus for Providing Tangible Control of Sound" filed Nov. 14, 2012, U.S. Provisional Patent Application No. 61/726,441, filed Nov. 14, 2012, entitled "Device and System Having Smart Directional Conferencing", and U.S. Provisional Patent Application No. 61/726,461 filed Nov. 14, 2012, entitled "Collaborative Document Review and Editing".

FIELD

Various features relate to methods, apparatuses and systems for providing tangible control of sound.

BACKGROUND

Current approaches to control sound use audio algorithms in combination with standard interfaces. For example, current approaches for controlling audio algorithms involve the use of conventional interfaces. Keyboards, mice, buttons, bars, menus, or their counterparts in software are used to tune different parameters to drive an algorithm. More intuitive and simpler controls may be possible in a software user interface space, but the controls are seldom sitting in the same space that the sound is happening.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A first example provides a method for controlling a sound field. The method includes displaying, on a physical space, a graphical representation of one or more sound projection patterns associated with a sound transducer array, wherein the sound transducer array is in communication with the physical space. The physical space may include, for example, a touch-sensing surface, a display screen and a tablet display. Once the graphical representation of the one or more sound projection patterns have been displayed, at least one command directed at the graphical representation may be detected for modifying the one or more sound projection patterns of the sound transducer array based on the at least one command. The at least one command may be a gesture that includes multiple tapping, drawing one or more circles around the one or more sound projection patterns and grouping multiple sound projection patterns of the one or more sound projection patterns together for manipulating as a group.

Displaying the one or more sound projection patterns may include generating the graphical representation of the one or more sound projection patterns based on a characteristic of the one or more sound projection patterns. Characteristics may include at least one of a beam width, a direction, an origin, a frequency range, a signal-to-noise ratio, and a type of generator or receiver of the one or more sound projection patterns. The graphical representation may be a scale proportional to the characteristic of the one or more sound projection patterns, where the scale includes a one-to-one correspondence with the characteristic of the at least one sound projection pattern.

According to one aspect, the graphical representation may include a color scheme assigned to each of the one or more sound projection patterns, where the color scheme includes a mapping of the characteristic to a color space.

According to another aspect, a location of the sound transducer array with respect to the physical space may be determined so that an origin of the graphical representation based on the location may be generated. Furthermore, an orientation of the sound transducer array with respective to the physical space may be determined so that an orientation vector as a reference on the graphical representation based on the orientation may be generated. The orientation of the sound transducer array may be relative as to the sound transducer array.

According to one aspect, the sound transducer array may include multiple microphones where the multiple microphones are located in a vehicle. The sound transducer array may also include multiple speakers where the multiple speakers are located in a vehicle.

According to one aspect, detecting the at least one command may include detecting an interaction of a user with the physical space and decoding the interaction to determine a desired operation by the user. The desired operation may include concealing the graphical representation of the one or more sound projection patterns. After the one or more sound projection patterns have been modified, the graphical representation of the one or more sound projection patterns on the physical space may be updated. A user interface may be displayed on the physical space to allow the user to select the desired operation. The desired operation may also include selecting the one or more sound projection patterns for application of a second operation thereto or creating one or more virtual groupings of the one or more sound projection patterns. The graphical representation may include an illustration of the one or more virtual groupings where the illustration includes one or more virtual layers, wherein each of the one or more virtual groupings corresponds to at least one of the one or more virtual layers.

According to one aspect, a second interaction of the user with the physical space may be decoded and a second desired operation by the user, wherein the second desired operation is applied to the one or more virtual groupings may be decoded.

A second example provides a sound transducer array in communication with a physical space for controlling a sound field. The sound transducer array may include a speaker array, a microphone array, in communication with the speaker array, for capturing sound and at least one processor in communication with the microphone array. The at least one processor may be configured to display, on a physical space, a graphical representation of one or more sound projection patterns associated with a sound transducer array, wherein the sound transducer array is in communication with the physical space. The physical space may include, for example, a touch-sensing surface, a display screen and a tablet display.

Once the graphical representation of the one or more sound projection patterns have been displayed, the at least one processor may be further configured to detect at least one command directed at the graphical representation. The at least one command directed at the graphical representation may be detected for modifying the one or more sound projection patterns of the sound transducer array based on the at least one command. The at least one command may be a gesture that includes multiple tapping, drawing one or more circles around the one or more sound projection patterns and grouping multiple sound projection patterns.

Displaying the one or more sound projection patterns may include generating the graphical representation of the one or more sound projection patterns based on a characteristic of the one or more sound projection patterns. Characteristics may include at least one of a beam width, a direction, an origin, a frequency range, a signal-to-noise ratio, and a type of generator or receiver of the one or more sound projection patterns. The graphical representation may be a scale proportional to the characteristic of the one or more sound projection patterns, where the scale includes a one-to-one correspondence with the characteristic of the at least one sound projection pattern.

According to one aspect, the graphical representation may include a color scheme assigned to each of the one or more sound projection patterns, where the color scheme includes a mapping of the characteristic to a color space.

According to another aspect, the at least one processor may be further configured to determine a location of the sound transducer array with respect to the physical space and generate an origin of the graphical representation based on the location. Furthermore, the at least one processor may be configured to determine an orientation of the sound transducer array with respective to the physical space and generate orientation vector as a reference on the graphical representation based on the orientation may be generated. The orientation of the sound transducer array may be relative as to the sound transducer array.

According to one aspect, the sound transducer array may include multiple microphones where the multiple microphones are located in a vehicle. The sound transducer array may also include multiple speakers where the multiple speakers are located in a vehicle.

According to one aspect, the at least one processor, for detecting the at least one command, may be further configured to detect an interaction of a user with the physical space and decode the interaction to determine a desired operation by the user. The desired operation may include concealing the graphical representation of the one or more sound projection patterns. After the one or more sound projection patterns have been modified, the graphical representation of the one or more sound projection patterns on the physical space may be updated.

According to one aspect, the at least one processor may be further configured to display a user interface on the physical space to allow the user to select the desired operation. The desired operation may also include selecting the one or more sound projection patterns for application of a second operation thereto or creating one or more virtual groupings of the one or more sound projection patterns. The graphical representation may include an illustration of the one or more virtual groupings where the illustration includes one or more virtual layers, wherein each of the one or more virtual groupings corresponds to at least one of the one or more virtual layers.

According to one aspect, the at least one processor may be further configured to decode a second interaction of the user with the physical space and decode a second desired operation by the user, wherein the second desired operation is applied to the one or more virtual groupings.

A third example provides a sound transducer array in communication with a physical space for controlling a sound field. The sound transducer array may include means for displaying, on a physical space, a graphical representation of one or more sound projection patterns associated with a sound transducer array, wherein the sound transducer array is in communication with the physical space. The physical space may include, for example, a touch-sensing surface, a display screen and a tablet display.

The sound transducer array may also include means for detecting at least one command directed at the graphical representation and means for modifying the one or more sound projection patterns of the sound transducer array based on the at least one command. The at least one command may be a gesture that includes multiple tapping, drawing one or more circles around the one or more sound projection patterns and grouping multiple sound projection patterns of the one or more sound projection patterns together for manipulating as a group.

For displaying the one or more sound projection patterns, the sound transducer array may include means for generating the graphical representation of the one or more sound projection patterns based on a characteristic of the one or more sound projection patterns. Characteristics may include at least one of a beam width, a direction, an origin, a frequency range, a signal-to-noise ratio, and a type of generator or receiver of the one or more sound projection patterns. The graphical representation may be a scale proportional to the characteristic of the one or more sound projection patterns, where the scale includes a one-to-one correspondence with the characteristic of the at least one sound projection pattern.

According to one aspect, the graphical representation may include a color scheme assigned to each of the one or more sound projection patterns, where the color scheme includes a mapping of the characteristic to a color space.

According to another aspect, the sound transducer array may further include means for determining a location of the sound transducer array with respect to the physical space and means for generating an origin of the graphical representation based on the location may be generated. Furthermore, the sound transducer array may further include means for determining an orientation of the sound transducer array with respective to the physical space and manes for generating orientation vector as a reference on the graphical representation based on the orientation may be generated. The orientation of the sound transducer array may be relative as to the sound transducer array.

According to one aspect, the sound transducer array may further include multiple microphones where the multiple microphones are located in a vehicle. The sound transducer array may also include multiple speakers where the multiple speakers are located in a vehicle.

According to one aspect, detecting the at least one command may include detecting an interaction of a user with the physical space and decoding the interaction to determine a desired operation by the user. The desired operation may include concealing the graphical representation of the one or more sound projection patterns. Additionally, the sound transducer array may include means for updating the graphical representation of the one or more sound projection patterns on the physical space after the one or more sound projection patterns have been modified.

According to one aspect, the sound transducer array may further include means for displaying a user interface on the physical space to allow the user to select the desired operation. The desired operation may also include selecting the one or more sound projection patterns for application of a second operation thereto or creating one or more virtual groupings of the one or more sound projection patterns. The graphical representation may include an illustration of the one or more virtual groupings where the illustration includes one or more virtual layers, wherein each of the one or more virtual groupings corresponds to at least one of the one or more virtual layers.

According to one aspect, the sound transducer array may further include means for decoding a second interaction of the user with the physical space and means for decoding a second desired operation by the user, wherein the second desired operation is applied to the one or more virtual groupings.

A fourth example provides a computer readable storage medium that includes one or more instructions for controlling a sound field, which when executed by at least one processor, causes the at least one processor to display, on a physical space, a graphical representation of one or more sound projection patterns associated with a sound transducer array, wherein the sound transducer array is in communication with the physical space. The physical space may include, for example, one or more of a touch-sensing surface, a display screen and a tablet display.

Once the graphical representation of the one or more sound projection patterns have been displayed, the at least one processor may be further configured to detect at least one command directed at the graphical representation. The at least one command directed at the graphical representation may be detected for modifying the one or more sound projection patterns of the sound transducer array based on the at least one command. The at least one command may be a gesture that includes multiple tapping, drawing one or more circles around the one or more sound projection patterns and grouping multiple sound projection patterns.

The computer readable storage medium that includes one or more instructions for controlling a sound field, which when executed by at least one processor, may further cause the at least one processor to detect at least one command directed at the graphical representation and modify the one or more sound projection patterns of the sound transducer array based on the at least one command; and update the graphical representation of the one or more sound projection patterns on the physical space.

According to one embodiment, the computer readable storage medium may further include one or more instructions, which when executed by at least one processor, causes the at least one processor to generate the graphical representation of the one or more sound projection patterns based on a characteristic of the one or more sound projection patterns when displaying of the one or more sound projection patterns.

According to one embodiment, the computer readable storage medium may further include one or more instructions, which when executed by at least one processor, causes the at least one processor to determine a location of the sound transducer array with respect to the physical space and generate an origin of the graphical representation based on the location.

According to one embodiment, the computer readable storage medium may further include one or more instructions, which when executed by at least one processor, causes the at least one processor to determine an orientation of the sound transducer array with respective to the physical space and generate an orientation vector as a reference on the graphical representation based on the orientation.

According to one aspect, the sound transducer array may include multiple microphones where the multiple microphones are located in a vehicle. The sound transducer array may also include multiple speakers where the multiple speakers are located in a vehicle.

According to one embodiment, the computer readable storage medium may further include one or more instructions, which when executed by at least one processor for detecting the at least one command, causes the at least one processor to detect an interaction of a user with the physical space and decode the interaction to determine a desired operation by the user. The desired operation may include selecting the one or more sound projection patterns for application of a second operation thereto.

According to one embodiment, the computer readable storage medium may further include one or more instructions, which when executed by at least one processor, causes the at least one processor to decode a second interaction of the user with the physical space and decode a second desired operation by the user, wherein the second desired operation is applied to the one or more virtual groupings.

DRAWINGS

Various features, nature and advantages may become apparent from the detailed description set forth below when taken in conjunction with the drawings in which like reference characters identify correspondingly throughout.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Figure 1:
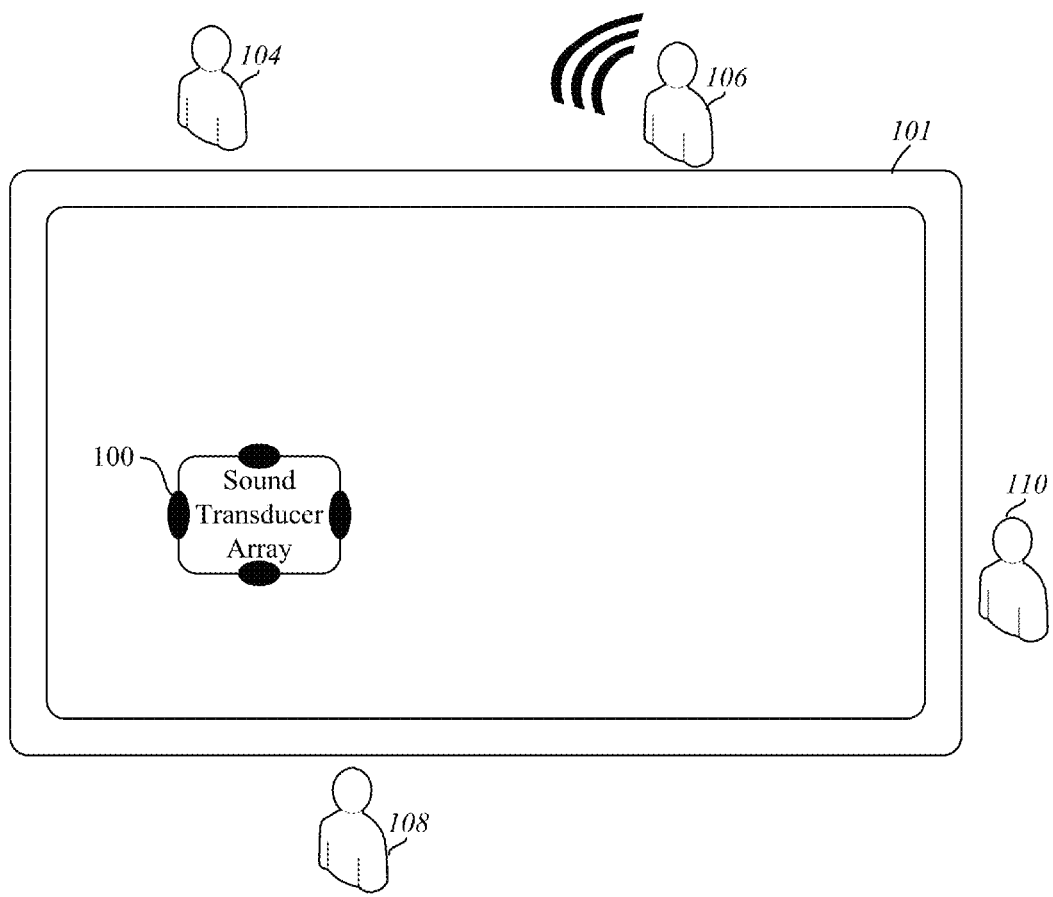
FIG. 1 illustrates an example of a typical system using a sound transducer array.

FIG. 1 illustrates an example of a typical system using a sound transducer array. As shown, the system includes a sound transducer array 100 located on a conference table 101. The sound transducer array 100 includes several microphones/speakers arranged in a manner to capture sound (or audio) from different directions. As an example, four individuals 104-110 may be located around of a conference table. One individual 106 may be speaking and the sound is captured by the sound transducer array 100; however there is no representation of the sound field of the captured sound either symbolically or visually on the conference table. Consequently, there is no confirmation that the sound transducer array 100 is focused on the individual 106 speaking and/or capturing the sound.

Various aspects of the method and apparatus for controlling a sound field in a physical space (e.g. physical surface) are described herein as embodied in a system that includes a sound transducer array (referred to herein as "sound transducer array", "transducer array" or simply "an array") along with a touch surface-enabled display table. The array may include a group of transducers (multiple speakers and/or microphones). The array may be configured to perform spatial processing of signals for the group of transducers so that sound rendering (in configurations where the array includes multiple speakers), or sound pick-up (in configurations where the array includes multiple microphones), may have spatial patterns that are focused in certain directions while reducing disturbances from other directions.

According to one embodiment, providing the intuitive and tangible aspect of controlling a sound field, user experience and efficiency of the control may be greatly enhanced. In one approach, modern touch surface-enabled display tables may be used to project visualized sound fields or sound projection patterns. The touch surface enabled display tables have a table surface capable of both displaying images as well as detecting touch input from users. Thus, users may directly and intuitively adjust parameters related to the visualized sound fields by interacting with the touch surface while receiving visual feedback in real-time or near real-time. Possible interaction modalities may include a user exercising one or more commands on the touch surface, and adjusting those commands according to visual feedback received from the change of the display on the touch surface.

Figure 2:
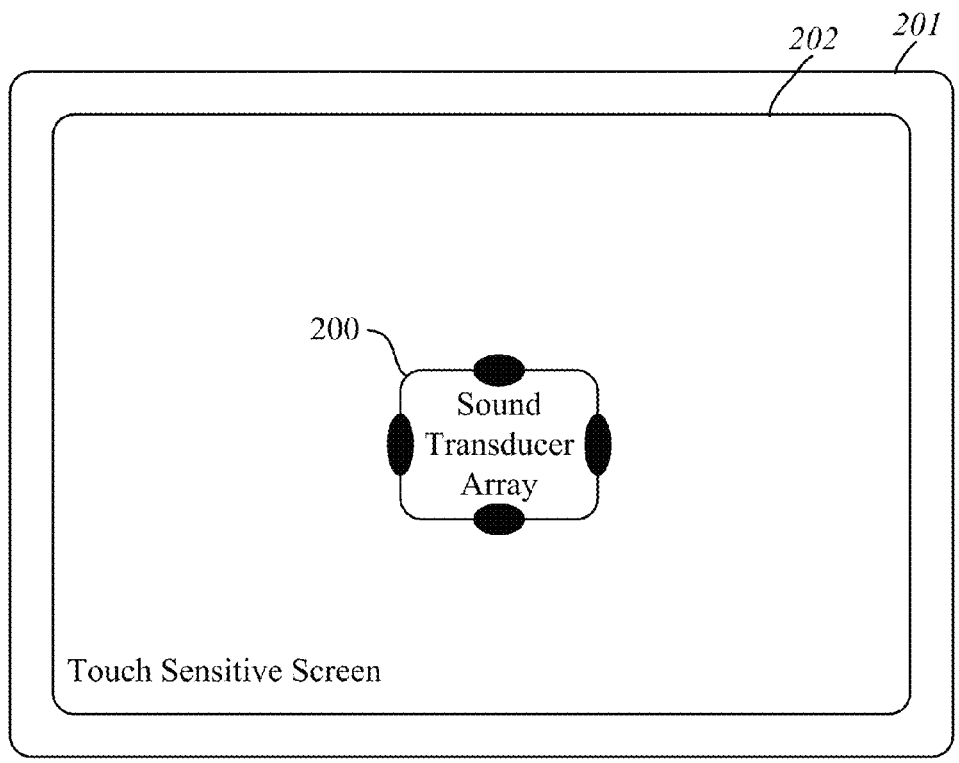
FIG. 2 illustrates a system that includes a sound transducer array and a device having a touch sensitive screen.

FIG. 2 illustrates a system that includes a sound transducer array and a device having a touch sensitive screen. As shown in FIG. 2, the system may include a sound transducer array 200 and a device 201.

In some implementations, the sound transducer array 200 may include at least one processor, a memory, several microphones and speakers, at least one transceiver, several inductive elements, a compass, at least one communication interface, and at least one identification marker. The microphones and speakers of the sound transducer array 200 may be arranged in a manner to capture sound, audio or microphone beams from different directions and to transmit a speaker beam that is displayed in the physical space, respectively. For example, the microphones and speakers may be arranged linearly, in a circle or any other arrangements. The sound transducer array 200 may communicate with the device 201 by using a communication interface and at least one transceiver. In some implementations, the transceiver provides a wireless communication link (for receiving and transmitting data) between the sound transducer array 200 and the device 201. Different implementations may use different communication protocols to communicate between the sound transducer array 200 and the device 201. Examples of communication protocols include near-field communication (NFC), Wi-Fi, Bluetooth, ZigBee, Digital Living Network Alliance (DLNA), and Airplay.

In some implementations, the compass provides a way for the sound transducer array 200 to determine its orientation. The orientation information may be used internally or may be passed on to other devices (e.g., device 201) in order to determine the position and/or orientation of the sound transducer array in some implementations. The inductive elements may also be used to determine the position and/or orientation of the sound transducer array. For example, the inductive elements may be used by a device (e.g., device 201) to determine the position and orientation of the sound transducer array on a touch sensitive screen. The identification marker may also be used to determine the position and/or orientation of the microphones and speakers.

The above description is an overview of possible components/elements of a sound transducer array. A more detailed description of components/elements of a sound transducer array will be further described below with reference to FIG. 16.

Furthermore, as shown in FIG. 2, the device 201 may include a touch sensitive screen 202. The touch sensitive screen 202 may be used for providing tangible control of sound. The touch sensitive screen 202 may also be used for sensing and capturing user movements (e.g., movement of finger on the touch screen). In some implementations, the device 201 and the touch sensitive screen 202 may be included within a surface table.

In addition to the touch sensitive screen 202, the device 201 may also include at least one processor, a memory, at least one transceiver, and at least one communication interface. In some implementations, the above components allow the device 201 to communicate with the sound transducer array 200, local and remote computers, wireless devices (e.g., phones), portable computer devices (e.g., tablets). The components/elements of the device 201 will be further described below with reference to FIG. 17.

Having provided an overview of the various devices and components of a system for representing and controlling a sound field in a physical space, a detailed description of how these devices are used in such a system will now be described. Several example use cases for the array are described with reference to FIGS. 3-6. These use cases may be displayed on a surface table, such as a conference table, or on one or more tablets, such as an iPad®, where each individual has a separate tablet. A system in which a plurality of individuals, each of which utilizes a tablet, will be further described below with reference to FIG. 18.

Figure 3:
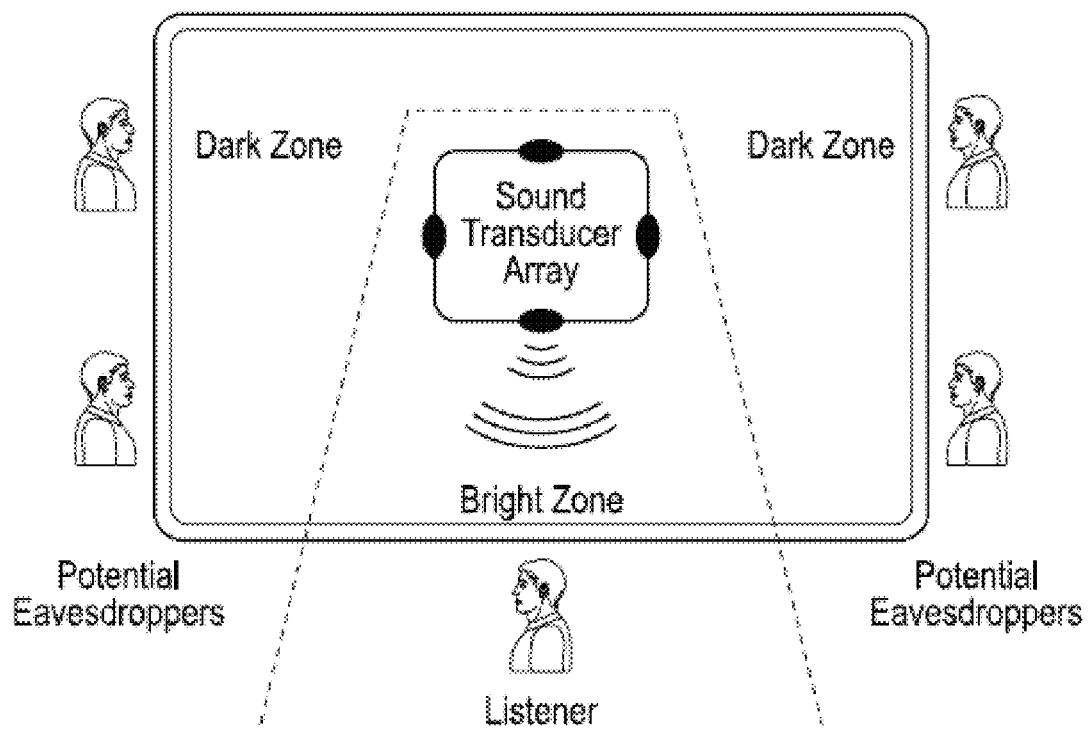
FIG. 3 illustrates an example of the array as utilized to create a privacy zone for voice communication.

FIG. 3 illustrates an example of the array as utilized to create a privacy zone for voice communication. As shown, a listener is in a "bright" zone and four (4) potential eavesdroppers are located in "dark" zones. The zones are illustrated on a physical space allowing individuals sitting around the physical space (e.g. a conference table) to visualize a pattern representing the "bright" zone and a pattern representing the "dark" zone or zones. An individual in the "bright" zone may hear the intended sound while an individual (or individuals) in the "dark" zone either hear a muted version of the sound in the bright zone, or hear a non-recognizable version of the sound in the bright zone. A non-recognizable version of the sound may be a masked version of the sound in the bright zone. Beamforming techniques or other spatial audio techniques may be applied in forming the bright and dark zones. Further explanation of these techniques may be found in U.S. Utility application Ser. No. 13/665,592, entitled "Systems, Methods, and Apparatus for Producing a Directional Sound Field" filed on Oct. 31, 2012. Representations of a bright zone and dark zone may also be visually displayed when sound is emanating from speakers in a sound transducer array. In such an embodiment the listener illustrated may be in a voice communication call, and may be using the sound transducer array to block the potential eavesdroppers from listening in on the listener's conversation. For example, display of the bright and dark zone patterns may be on a surface table as further described herein.

Figure 6:
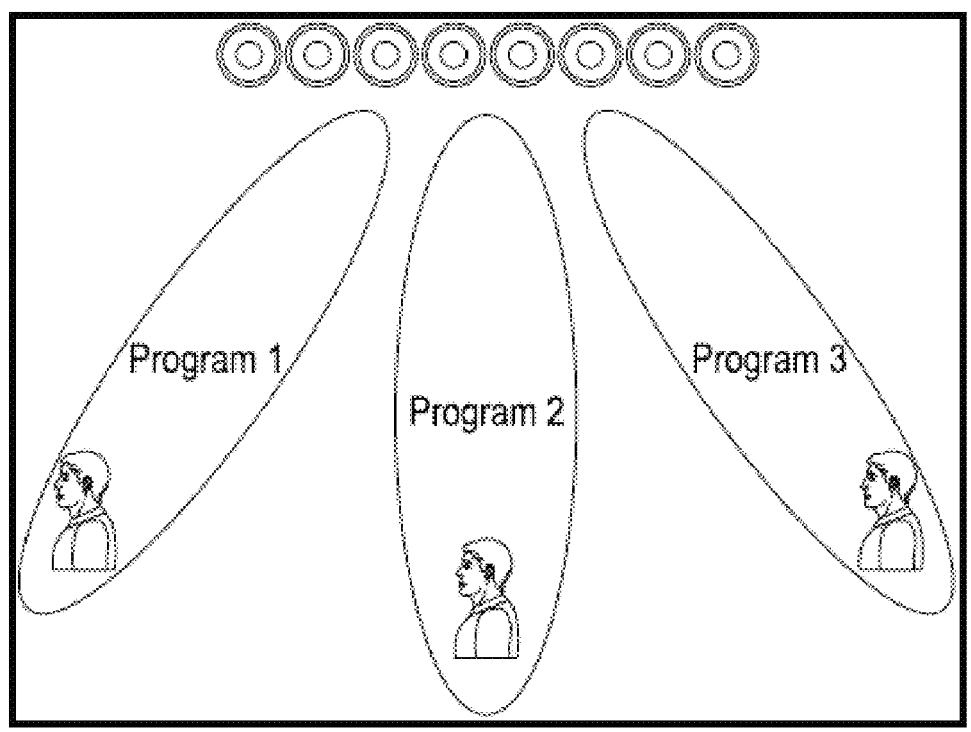
FIG. 6 illustrates an example of utilizing the array for delivering multiple audio programs simultaneously in different directions without interfering with each other.

A different variant of the privacy zone for voice communication is to use a similar technique as creating a privacy zone described above, but the listener and eavesdropper are all listening to different programs, for example, as shown in FIG. 6. In such a variant, the patterns illustrated on the physical space may either be a pattern representing a program. In a different configuration, the patterns illustrated may also represent a privacy zone for hearing the programs. For example, each person around the physical space may be listening to a different sound recording or sound stream (e.g. 3 radio stations). The bright zone and dark zones may be individualized for each person. One possible implementation, where there are three persons for example, is to overlay three privacy zones and display representations of each of the three privacy zones in the physical space. Thus, each person, in effect has their own privacy zone with respect to the other person.

Figure 4:
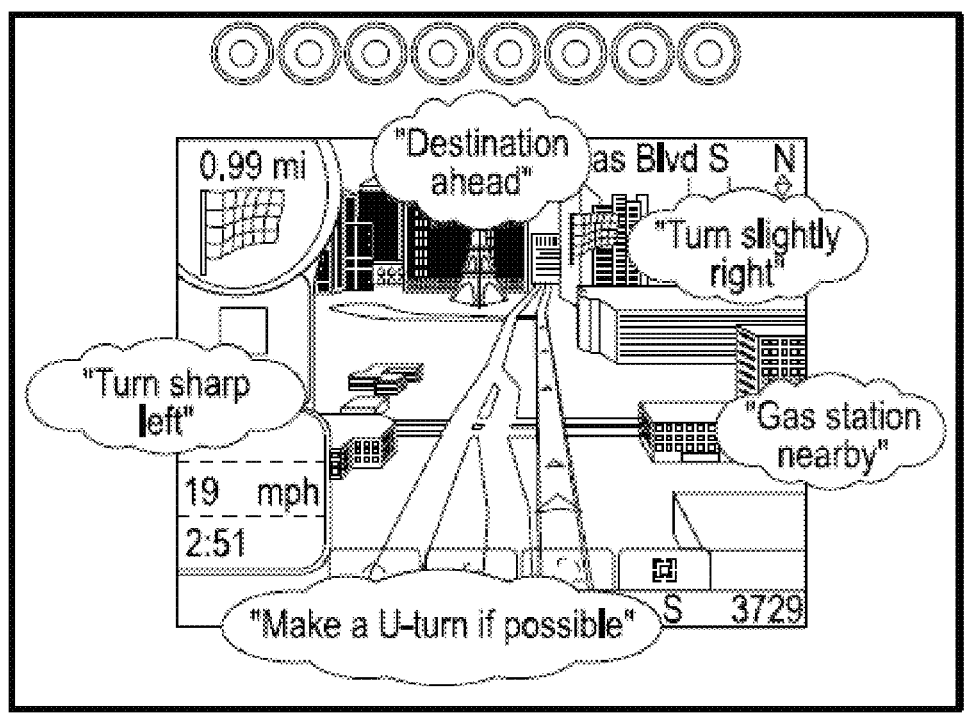
FIG. 4 illustrates an example of a spatialized vehicle navigation system using the array.

FIG. 4 illustrates an example of a spatialized vehicle navigation system using the array. In this example, sound for each turn-by-turn voice command may seem to originate from a direction towards which the listener should make a turn.

Figure 5:
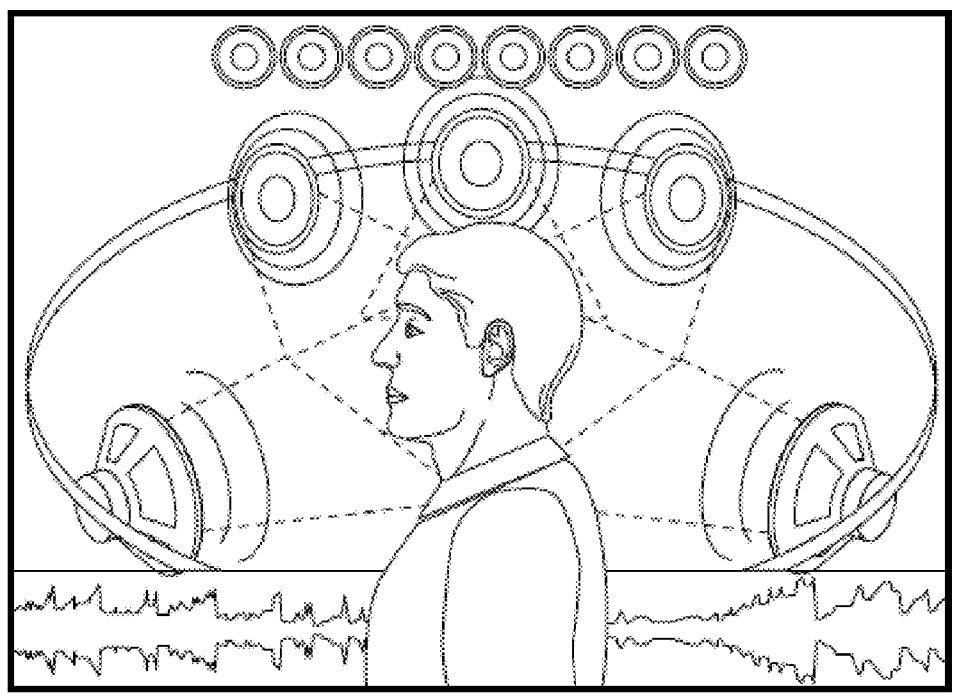
FIG. 5 illustrates an example of utilizing the array for a surround sound experience.

FIG. 5 illustrates an example of utilizing the array for a surround sound experience.

FIG. 6 illustrates an example of utilizing the array for delivering multiple audio programs simultaneously in different directions without interfering with each other.

The spatial processing of signals for the array to implement the above use examples may be provided by control software. While a user may interact with the control software using a traditional "keyboard and mouse" interface to configure and control sound field producing and pickup pattern adjustments, the traditional interface still only provides an abstract approach in controlling the sound field. Further, the interface needs to be in the same location where the sound occurs.

Figure 7:
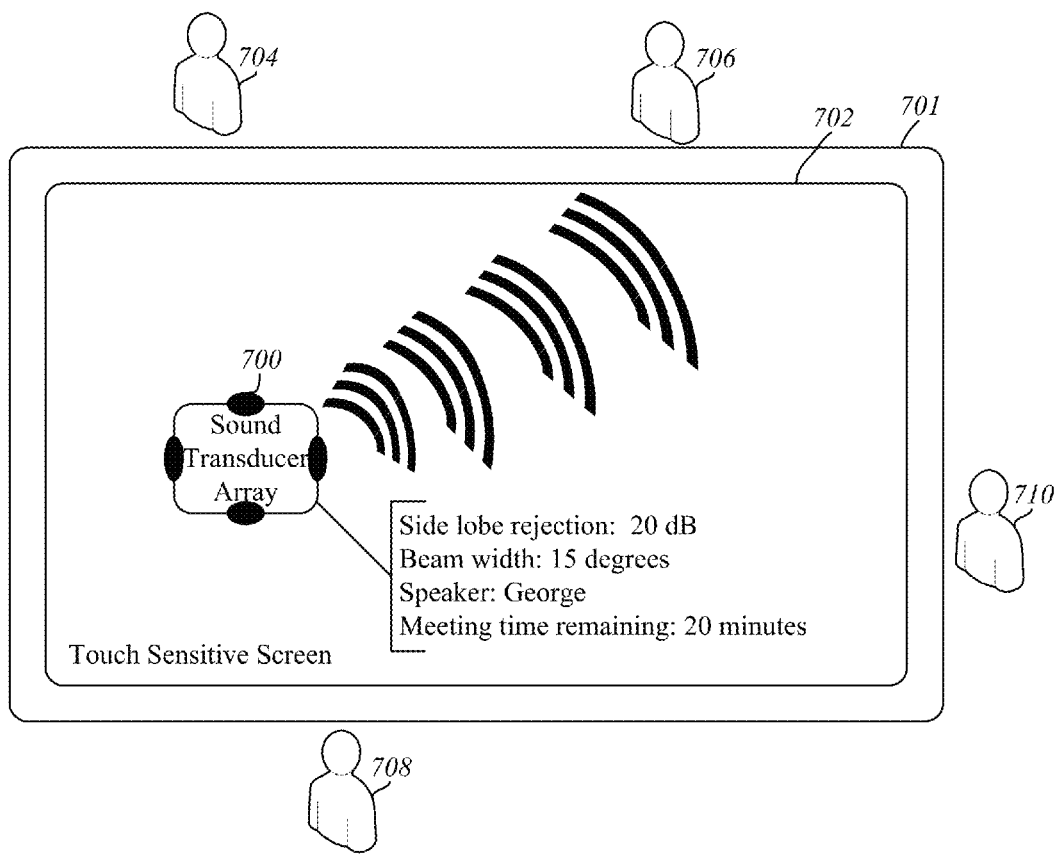
FIG. 7 illustrates an example of representing a sound field in a physical space, according to one embodiment.

FIG. 7 illustrates an example of representing a sound field in a physical space, according to one embodiment. In the system, a graphical representation of sound captured by a sound transducer array may be juxtaposed in the physical space of the sound field. The graphical representation may be in the form of sound projection patterns (e.g. one or more physical wave fields).

As shown, the system may include a sound transducer array 700 and a device 701. In some implementations, the device 701 may be part of a table. The sound transducer array 700 may include several microphones/speakers arranged in a manner to capture sound/audio from different directions. The microphones may be arranged linearly, in a circle or any other arrangements. The device 701 may include a touch sensitive screen 702. The touch sensitive screen 702 may be for displaying the graphical representation of the sound field of the captured sound in a physical space. Auxiliary information regarding the sound can also be displayed in text and charts around the tagged array. If something needs to be changed on the sound, a touch screen can provide some control that lets an individual (or user) modify the sound.

The sound transducer array 700 may communicate with the device 701 using at least one wireless communication link using a particular communication protocol. Examples of communication protocols include near-field communication (NFC), Wi-Fi, Bluetooth, ZigBee, Digital Living Network Alliance (DLNA), and Airplay.

Furthermore, FIG. 7 illustrates the device 701, with the touch sensitive screen 702, as part of a conference table that has four individuals 704-710 sitting around the table participating in a meeting/conference. As shown in FIG. 7, the sound transducer array 700 may be positioned on top of the screen 702 of the device 701.

From the sound transducer array 700, actual filter information on microphones and speakers are available. From this information, the sound projection pattern or microphone pickup pattern in a 3D space (in this case, 2D horizontal space contains the majority of information) can be calculated. This information may be transmitted to the surface table via wireless protocols like Bluetooth, Nearfield Communication, DLNA, etc. as indicated above. With this information, various computer graphical visualizations can be generated. The graphics in general may be 2D graphics matching the 2D sound pressures or exaggerated versions of it. The original of the graphics may be anchored to the center of the sound transducer array 700 and may shift when it moves. In some implementations, ultrasonic/infrared/sonic pulses may be used to determine the position of the sound transducer array 700. In other implementations, the sound transducer array 700 may include a Near Field Communication (NFC) tag, which allows the device 701 to determine the position of the sound transducer array 700. As such, the representation (i.e. symbolization and representation) of sound transducer array may be aligned with the actual sound field in space.

Figure 8:
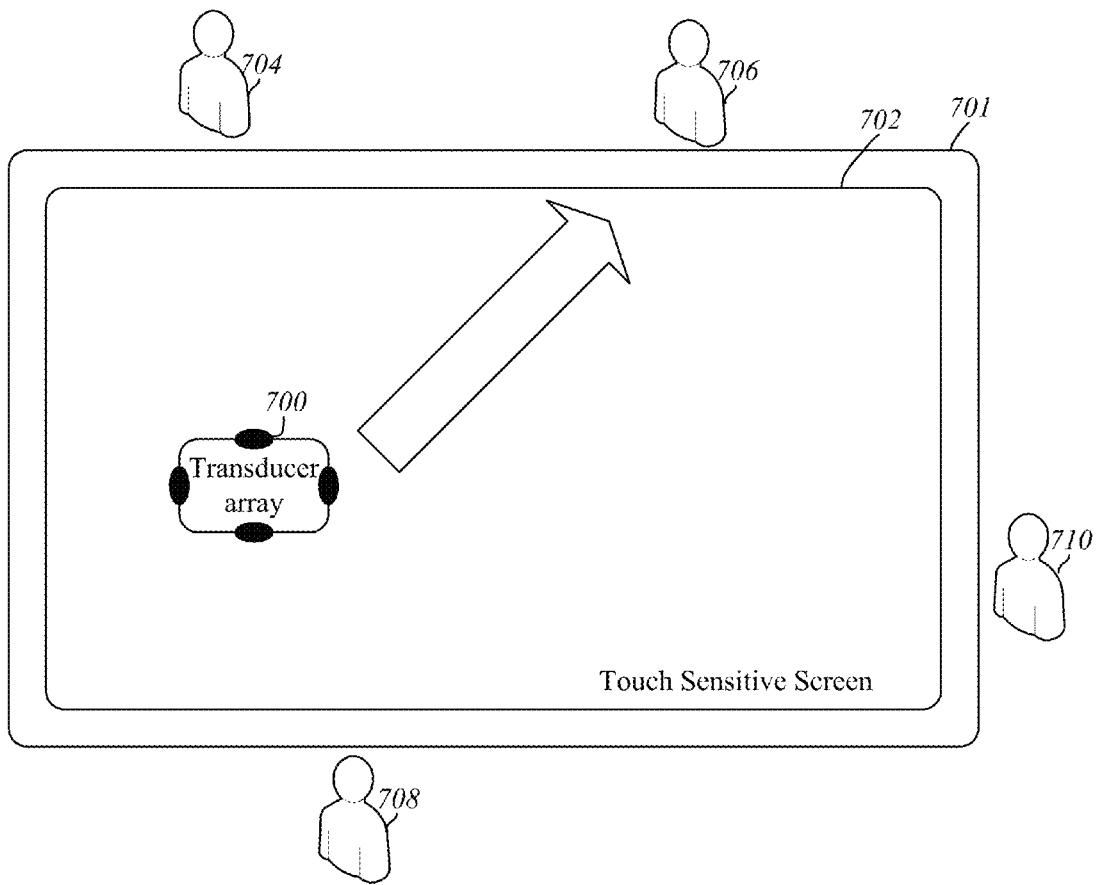
FIG. 8 illustrates an example of a sound field visualization system where the sound field is represented symbolically as an arrow.

FIG. 8 illustrates an example of a sound field visualization system where the sound field is represented symbolically as an arrow. The arrow may extend from the sound transducer array 700 to the originating location of the captured sound.

Figure 9:
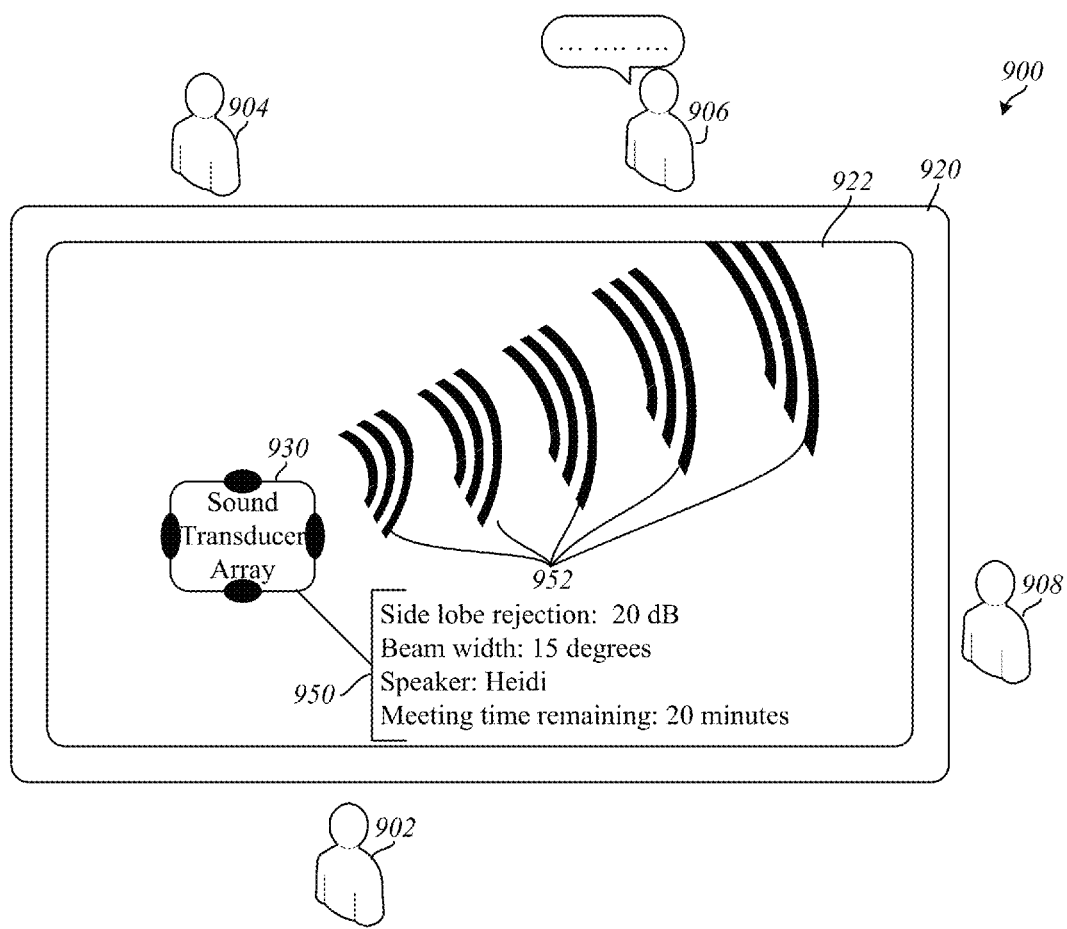
FIG. 9 illustrates an example of representing a sound field visualization image in a physical space showing a sound transducer array is not directed at the individual speaking, according to one embodiment.

FIG. 9 illustrates an example of representing a sound field visualization image in a physical space showing that a sound transducer array is not directed at the individual speaking, according to one embodiment.

A system is described herein that allows an individual (or user) to directly "touch the sound" to provide for a more intuitive and direct approach in interacting with sound field producing and pickup patterns. In one aspect of the disclosed approach, a touch surface-enabled table 920, as illustrated in FIG. 9, may include a touch screen interface and other sensors on a touch screen display surface ("table surface") 922.

Tagged objects, such as a sound transducer array ("array") 930, may be placed on top of and near the table 920. The example described in FIG. 9 includes four individuals 902, 904, 906, and 908 participating in a teleconference and located around the touch surface-enabled table 920, such as a conference table. One individual 906 may be speaking, with sound from that individual being captured by the array 930.

The array 930 may include several microphones/speakers arranged in a manner to capture/produce sound (or audio) from/to different directions. The microphones may be arranged linearly, in a circle or any other arrangements. Information and graphics may be displayed on the table 920 for these objects. For example, a graphical information element 950 may be displayed on the table surface 922 that describes parameters for the teleconference such as spatial processing parameters (illustrated as "Side lobe rejection: 20 dB" and "Beam width: 15 degrees"), an identification of the speaker (illustrated as "Speaker: Heidi"), and time information (illustrated as "Meeting time remaining: 20 minutes").

In addition, for tagged objects that are sound devices such as the array 930, graphical representations of sound radiation and/or microphone pickup patterns may be visualized near them. In some implementations, ultrasonic/infrared/sonic pulses are used to determine the position of the array 930. In other implementations, the array 930 may include a Near Field Communication (NFC) tag, which allows the table 920 to determine a position and relative orientation of the array 930. As such, a representation (i.e. symbolization and representation) of any sound projection patterns related to the array 930 may be aligned with an associated actual sound field in space. For example, a sound projection pattern (or field visualization image) 952 may be displayed on the table surface 922 for the representation of the sound field of the captured sound. The sound field visualization image 952 may provide visual confirmation that the array 930 is focused on the individual 906 speaking and/or capturing the sound. As may be seen in FIG. 9, the sound field visualization image 952 may visually show the participants that the array 930 is not—even though it should be—directed at the individual 906, who is speaking.

Figure 12:
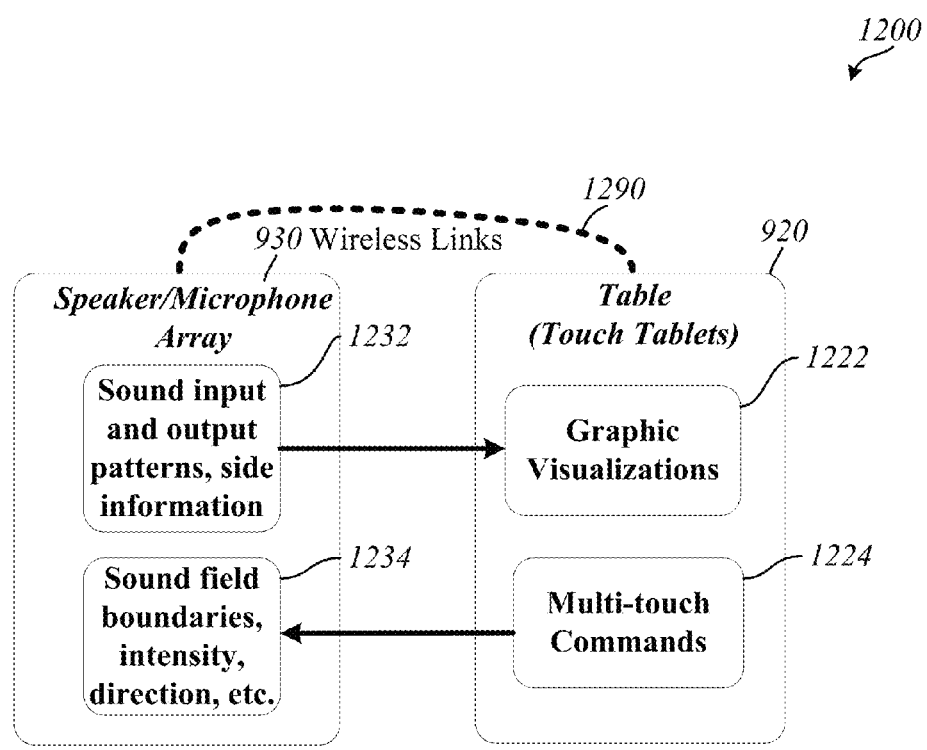
FIG. 12 illustrates a block diagram of sound field visualization and control system.

In one aspect of the disclosed approach, touch screen control software may be used to modify spatial processing characteristics of the array 930. The touch screen control software may be implemented as part of a sound field visualization and control system ("sound field system") 1200, an example of which is depicted in FIG. 12. In the sound field system 1200, the array 930 may communicate with the table 920 using any number of wireless communication links 1290 using various communication technologies.

From the array 930, actual filter information on microphones and speakers contained therein is available. From this information, a sound projection pattern or microphone pickup pattern in a three-dimensional (3D) space (in this case, a two-dimensional (2D) plane horizontal to the table surface 922 contains the majority of information) may be determined. This information may be transmitted to the surface table via wireless communication links 1290. While the table surface 922 displays the visual counterpart of a sound projection pattern's behavior (illustrated as "Graphic Visualizations" 1222), the table 920 may also function as a tangible interface with multi-touch and other command sensors (illustrated as "Multi-touch Commands" 1224).

According to one embodiment, a user interface may be displayed on the physical space to allow the individual (or user) to select a desired operation; the desired operation may include selecting the one or more sound projection patterns for application of a second operation thereto or creating one or more virtual groupings of the one or more sound projection patterns. The graphical representation may include an illustration of the one or more virtual groupings; where the illustration may include one or more virtual layers, wherein each of the one or more virtual groupings corresponds to at least one of the one or more virtual layers.

Individuals (or users) may directly and intuitively adjust parameters related to the visualized sound projection patterns by interacting with the touch surface while receiving visual feedback in real-time or near real-time. Possible interaction modalities may include an individual exercising one or more commands on the touch surface. The commands may be used to manipulate the graphical representation of one or more sound projection patterns (e.g. one or more physical wave fields) associated with a sound transducer array. The command may be in the form of text, communication from keyboards, mice, buttons, bars, menus, or their counterparts in software. The command may also be a gesture which can be adjusted based on visual feedback received from the change of the display on the touch surface. The gesture may be performed with an individual's fingers instead of a computer mouse. Gestures can include, but are not limited to, selecting a sound projection pattern by multiple (e.g. double or triple) tapping, drawing a circle two or more times around the pattern, sending different beams to different virtual layers, hiding one or more beams temporarily, selecting one or more beams, grouping multiple sound projection patterns together and manipulating them in a group manner and/or application of an additional graphic effect once an beam or grouping is selected so the beam or grouping may be modulated and emphasized.

Returning to the example in FIG. 9, the graphic visualizations 1222 may be generated with information received from the array 930 (illustrated as "Sound input and output patterns, side information" 1232). The graphics in general may include a 2D graphic matching the 2D sound pressures, or exaggerated versions of it. In the example illustrated in FIG. 9, the sound field visualization image 952 may visually represent the 2D sound field for the captured sound. In one aspect of the disclosed approach, origins of the graphics may be anchored to a center of the array 930 and may shift if the array 930 is moved.

Figure 10:
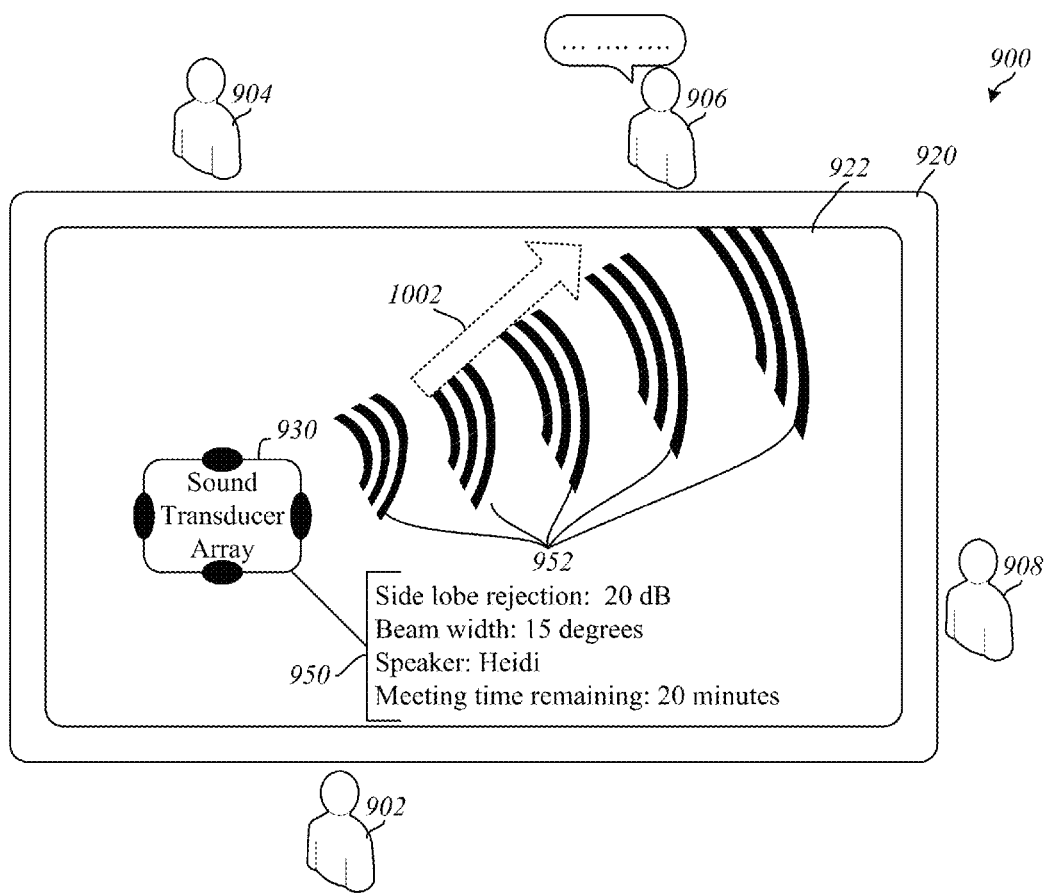
FIG. 10 illustrates the touch surface-enabled table of FIG. 9 showing a dragging command illustrated as an arrow on the table.
Figure 11:
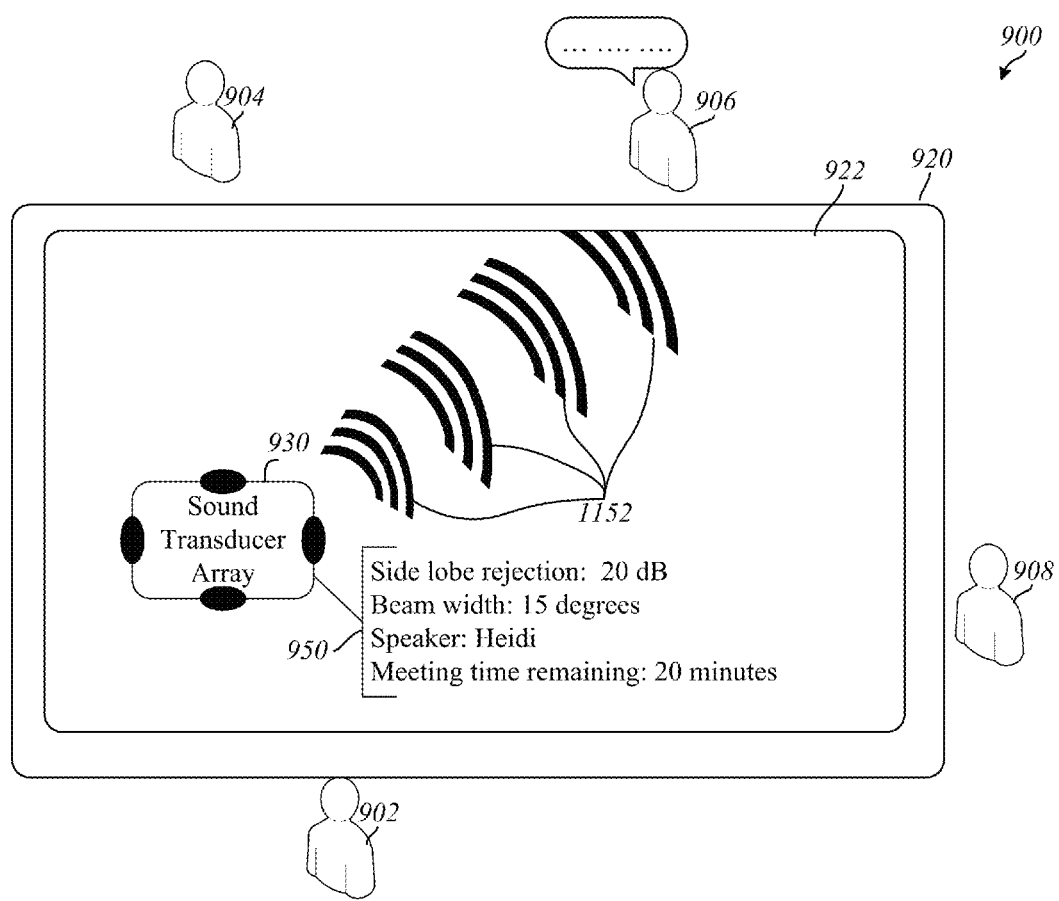
FIG. 11 illustrates an adjusted sound field of the array, visualized as an updated sound field visualization image, which shows the participants that the array is now properly directed to receive sound from the individual.

As shown in FIG. 9, the sound field visualization image 952 visually shows the participants that the array 930 is not—even though it should be—directed at the individual 906, who is speaking, any one of the participants may perform a gesture to re-direct the sound field of the array 930 towards the individual 906. Control information, such as that based on the multi-touch commands 1224 received from the table surface 922, may be used to control the array 930 by changing characteristics of the array 930 (illustrated as "Sound field boundaries, intensity, direction, etc." 1234). Thus, the individual 906 may perform a dragging command on the table surface 922, illustrated in FIG. 10 as an arrow 1002, and redirect the array 930. FIG. 11 illustrates an adjusted sound field of the array 930, visualized as an updated sound field visualization image 1152, which shows the participants that the array 930 is now properly directed to receive sound from the individual 906. Thus, a user may literally "touch the sound" and perform such operations as redirect beam patterns, draw new beam patterns, adjust parameter values, etc., and see visual change as sound field is being manipulated.

Figure 13:
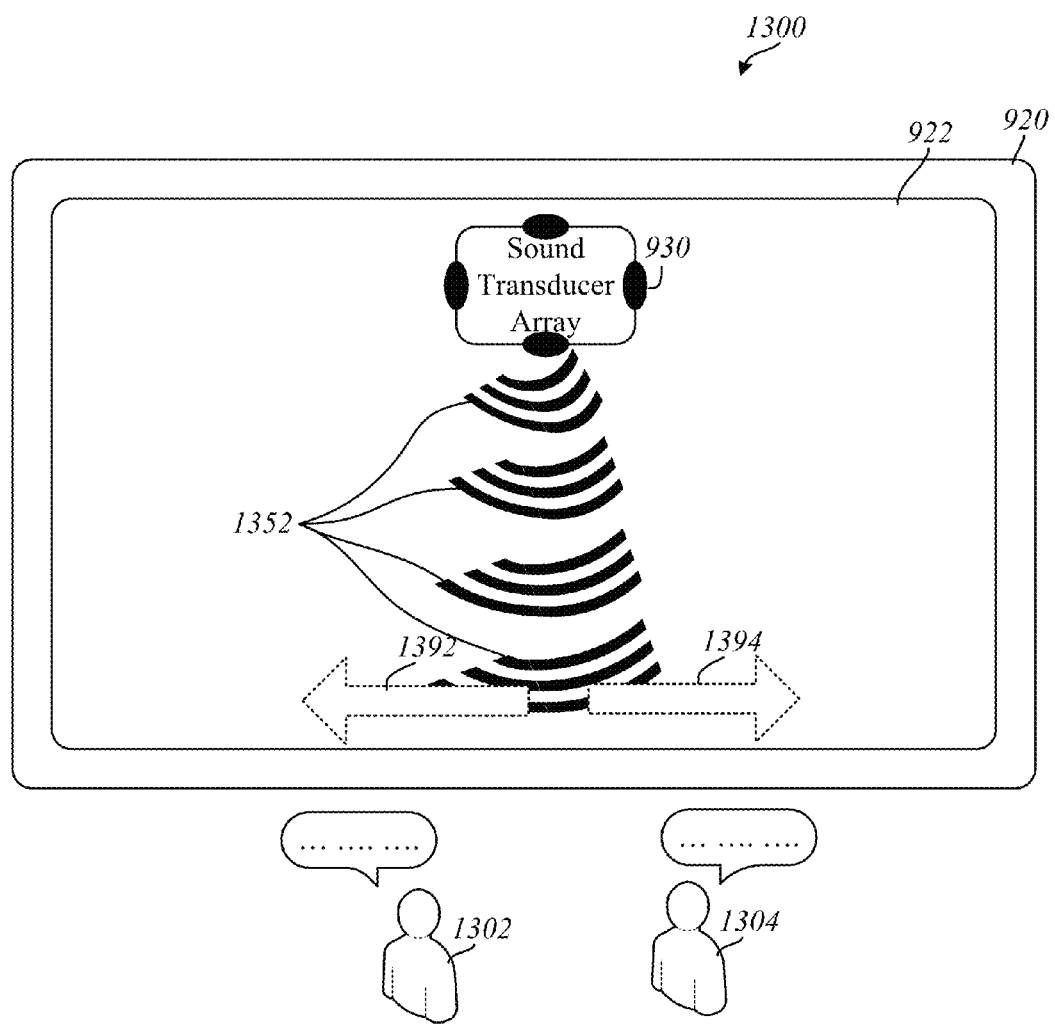
FIG. 13 illustrates a teleconference system or a sound stage scenario where a user may need to control pickup of sound from two adjacent talkers separated from each other at a distance.

In another example, such as in a teleconference system or a sound stage scenario 1300 as illustrated in FIG. 13, a user may need to control pick up of sound from two adjacent talkers 1302, 1304 separated from each other at a distance. Because the distance to cover between the adjacent talkers 1302, 1304 is wide, a pickup beam from the array 930 may need to be adjusted so that the pickup beam is wide enough to cover the talkers 1302, 1304, but not so wide as to pick up spurious sound such as background noise. By being able to visually see the pickup beam, as illustrated by a sound field visualization image 1352 displayed on the surface 922, the participants may see that the pickup beam from the array 930 is too narrow. That is, a user may see that, as configured, the pickup beam from the array 930 is not wide enough. In this example, such as through the use of two hands, the user may gesture to the table 920, as illustrated by arrows 1392, 1394, a "zooming" of the pickup beam from the array 930. The table 920 may then communicate to the array 930 that the user wants a wider beam. The array 930 may appropriately adjust its internal filters, and the table 920 may visualize a wider beam on the table surface 922, all in real-time or near real-time.

Figure 14:
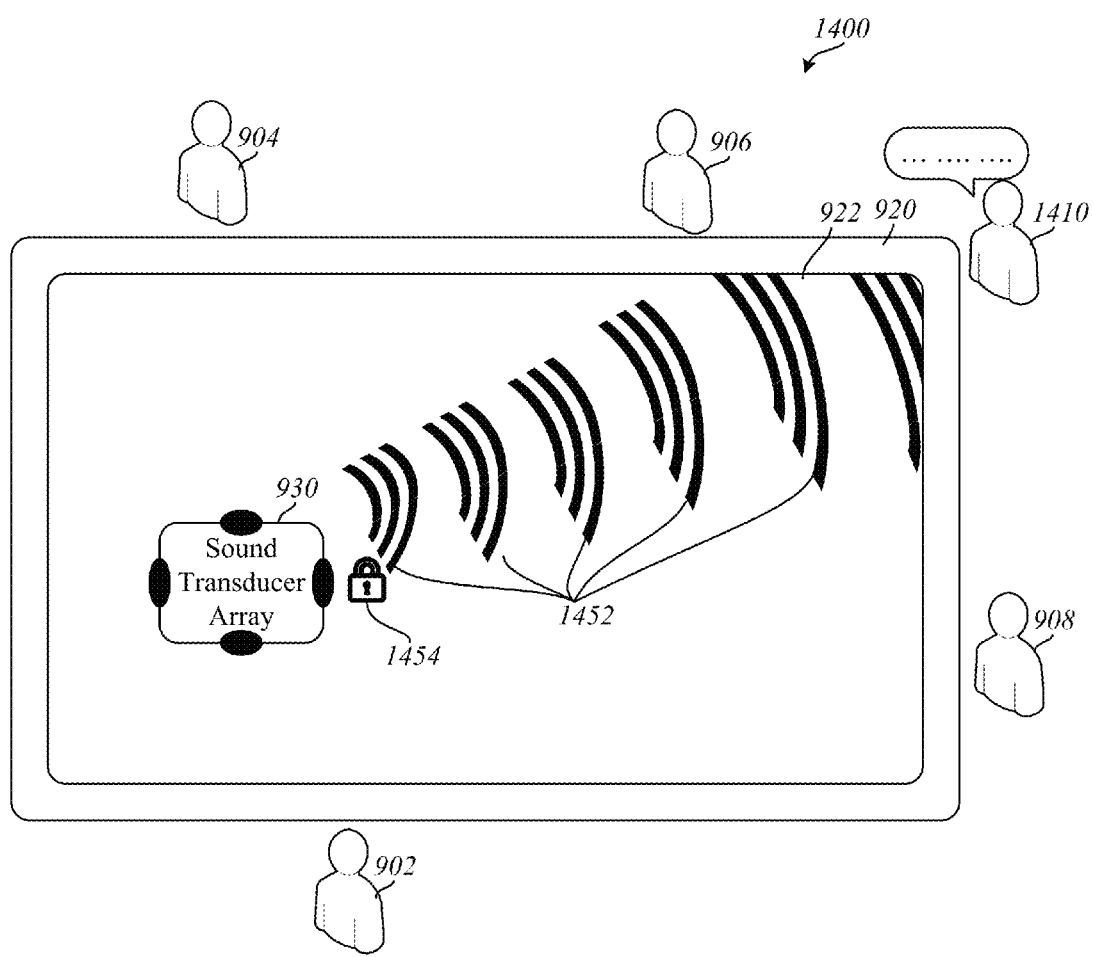
FIG. 14 illustrates the touch surface-enabled table of FIG. 8 having a very important talker ("VIP"), whose voice is a major focus of a pickup beam from the array.

The array 930 may follow whoever is speaking such that the pickup beam may automatically switch to be directed at whoever is speaking Referring to the example of FIG. 9, as further modified in FIG. 14, there may exist a very important talker ("VIP") 1410, whose voice is a major focus of a pickup beam from the array 930. In such a situation, various aspects of the techniques described in this disclosure may sacrifice losing some content from other individuals such as the individuals 902, 904, 906, and 908, in order for a beam to be focused on VIP 1410. In this example, by a gesture such as triple-tapping or drawing a circle two times in a direction of the VIP 1410, the pickup beam from the array 930 may be locked to follow the VIP 1410, and the array 930 may now only record the VIP 1410. A sound field visualization image 1452 may be displayed on the table surface 922 to show the participants a current direction of the pickup beam from the array 930, and a lock icon 1454, as well as other visual indicators, may also appear on the table surface 922 to indicate that the pickup beam is in a locked mode. A user may use another gesture to unlock the pickup beam, so that array 930 may continue beamforming and/or tracking whomever is speaking.

The various aspects described herein may also be extended to tablet or other touch-screen devices, where arrays may also be tagged and represented on the tablet devices. For example, a number of participants may each have a tablet device with an associated sound transducer array that may be included as part of the system along with the table 920.

Having provided an overview of the various devices and components of a system for representing a sound field in a physical space, detailed description of how these devices are used in such a system will now be described.

Figure 15:
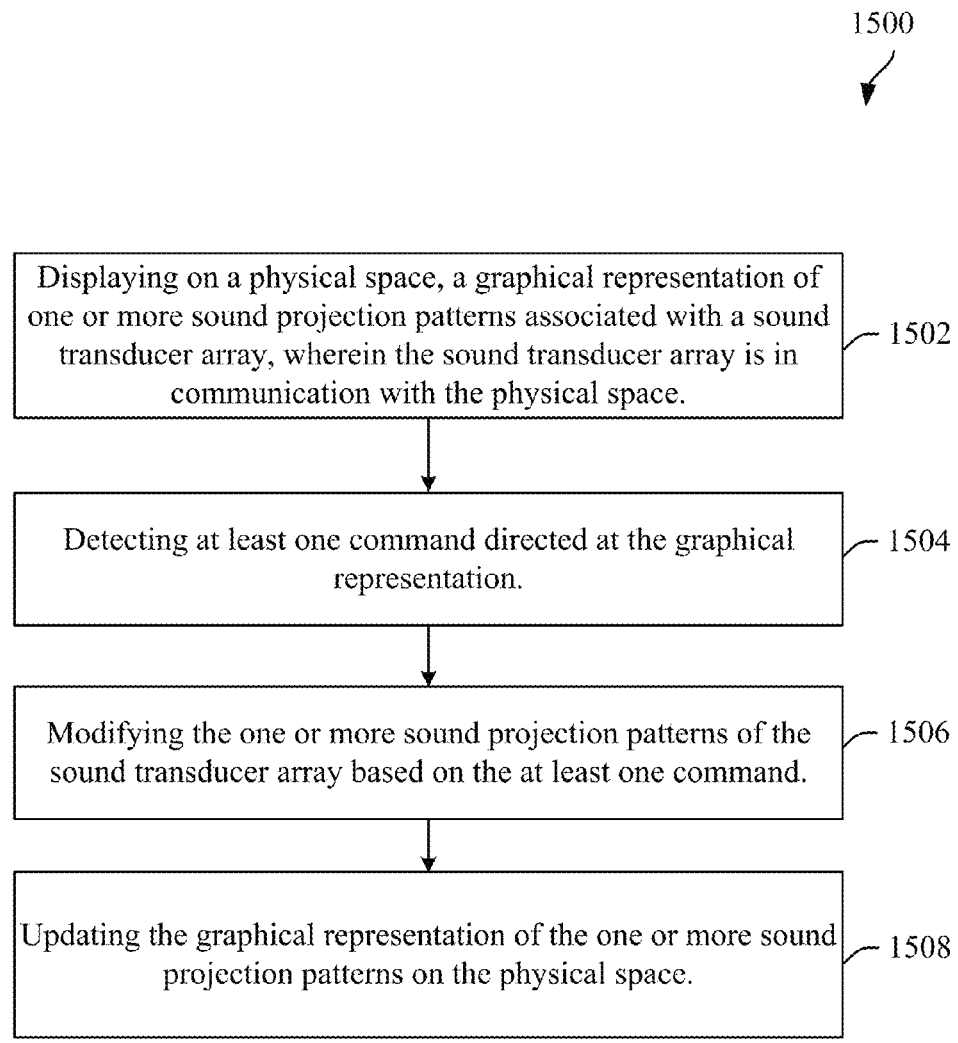
FIG. 15 illustrates a flow chart of an overview method for representing a sound field in a physical space, according to one embodiment.

FIG. 15 illustrates a flow chart of an overview method for providing tangible control of sound, according to one embodiment. The sound may be controlled in real-time or near real-time and may include subsonic sounds, ultrasonic sounds, infrared sounds, and radio frequency sounds. The physical surface may be, for example, a display screen, a touch sensitive screen, touch-sensing surface or a tablet display.

As shown in FIG. 15, a graphical representation of one or sound projection patterns associated with a transducer array may be displayed on a physical surface, where the transducer array is in communication with the physical space 1502. The graphical representation of the one or more sound projection patterns may be generated based on a characteristic of the one or more sound projection patterns. The characteristic may comprise at least one of a beam width, a direction, an origin, a frequency range, a signal-to-noise ratio, and a type of generator or receiver of the one or more sound projection patterns. The graphical representation may comprise a scale proportional to the characteristic of the one or more sound projection patterns, where the scale comprises a one-to-one correspondence with the characteristic of the at least one sound projection pattern. According to one embodiment, the graphical representation may comprise a color scheme assigned to each of the one or more sound projection patterns wherein the color scheme comprises a mapping of the characteristic to a color space.

Once the graphical representation of one or more sound projection patterns associated with a transducer array is displayed on the physical space, at least one command directed at the graphical representation may be detected 1504. As described above, the at least one command may be a gesture where the gesture can include, but is not limited to, multiple tapping, drawing one or more circles around the one or more sound projection patterns and grouping multiple sound projection patterns of the one or more sound projection patterns together for manipulating as a group.

According to one embodiment, detecting at least one command may comprise detecting an interaction of a user with the physical space and decoding the interaction to determine a desired operation by the user. The desired operation may comprise concealing the graphical representation of the one or more sound projection patterns (e.g. physical wave fields). Furthermore, a user interface may be displayed on the physical space to allow the user to select the desired operation; the desired operation may comprise selecting the one or more sound projection patterns for application of a second operation thereto or creating one or more virtual groupings of the one or more sound projection patterns. The graphical representation may comprise an illustration of the one or more virtual groupings; where the illustration may comprise one or more virtual layers, wherein each of the one or more virtual groupings corresponds to at least one of the one or more virtual layers.

According to one embodiment, a second interaction of the user with the physical space may be decoded along with a second desired operation by the user, wherein the second desired operation is applied to the one or more virtual groupings.

Based on the at least one command, the one or more sound projection patterns of the sound transducer array may then be modified 1506 and the graphical representation of the one or more sound projection patterns on the physical space may be updated 1508.

According to one embodiment, a location of the sound transducer array may be determined with respect to the physical space to generate an origin of the graphical representation based on the location.

According to one embodiment, an orientation of the sound transducer array with respective to the physical space may be determined to generate an orientation vector as a reference on the graphical representation based on the orientation. The orientation of the sound transducer array may be relative as to the sound transducer array.

According to one embodiment, the sound transducer array may comprise multiple microphones where the multiple microphones are located in a vehicle. The sound transducer array may also comprise multiple speakers where the multiple speakers are located in a vehicle.

According to one embodiment, the sound transducer array may comprise a combined microphone and speaker array. Alternatively, the sound transducer array may comprise a separate microphone array and a separate speaker array. The microphone array may capture a microphone beam which may be displayed in the physical space in a first color and the speaker array may transmit a speaker beam that is displayed in the physical space as a second color where the first color is different than the second color.

Figure 16:
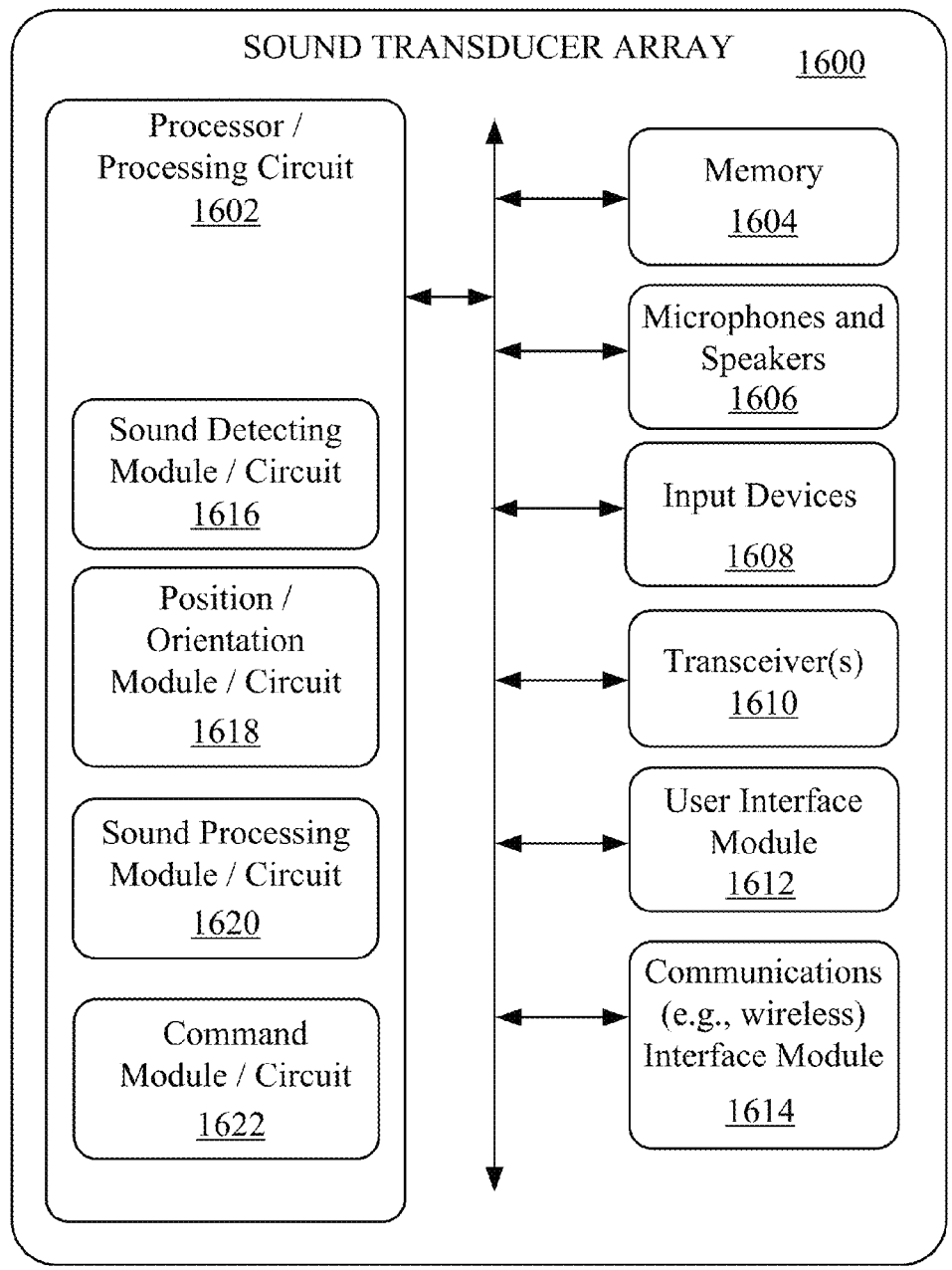
FIG. 16 illustrates an example of a sound transducer array that some implementations may use.

FIG. 16 illustrates an example of a sound transducer array that some implementations may use. As shown in FIG. 16, the sound transducer array 1600 may include at least one processor/processing circuit 1602, a memory 1604, a plurality of microphones and speakers 1606, several input devices 1608, at least one transceiver 1610, at least one user interface module 1612, and at least one communications interface module 1614.

The microphones and speakers 1606 may be used to capture sound and/or voice and transmit a speaker beam that is displayed in the physical space. The input devices 1608 may allow a user to literally "touch the sound" and perform such operations as redirect beam patterns, draw new beam patterns, adjust parameter values, etc., and see visual change as a sound field is being manipulated.

The transceiver 1610 may allow the sound transducer array to transmit and receive wireless signals from other devices (e.g., phone, computer, tablet, sound transducer array). The sound transducer array may include multiple transceivers, which allows the sound transducer array to communicate (e.g., wirelessly) with different devices using different communications links and different communication protocols. In some implementations, the user interface module 1612 provides an interface between the microphones 1606, input devices 1608 and the processor/processing circuit 1602. The user interface module 1612 may include several user interface modules (e.g., a module for each component). In some implementations, the communications interface module 1614 provides an interface between the transceiver 1610 and the processor/processing circuit 1602. The communications interface module 1614 may include several interface modules (e.g., a module for each transceiver).

As shown in FIG. 16, the processor/processing circuit 1602 may include a sound detecting module/circuit 1616, position/orientation module/circuit 1618, a sound processing module/circuit 1620, and a command module/circuit 1622.

The sound detecting module/circuit 1616 may be for detecting and capturing sound. In some implementations, the sound detecting module/circuit 1616 may capture sound from the microphones 1606. The position/orientation module/circuit 1618 may be for determining the position and/or orientation of the sound transducer array 1600 in some implementations. The sound processing module/circuit 1620 may be for processing sound captured by the microphones 1606, calculating a sound projection pattern of the captured sound and displaying the graphical representation on the physical space. The command module/circuit 1622 may be for processing control information based on multi-touch commands (or gestures) to re-direct the sound field of the array. The processing of sound may include extracting individual sound from the captured sound. The processing of sound may also include identifying the identity of speakers in some implementations.

Figure 17:
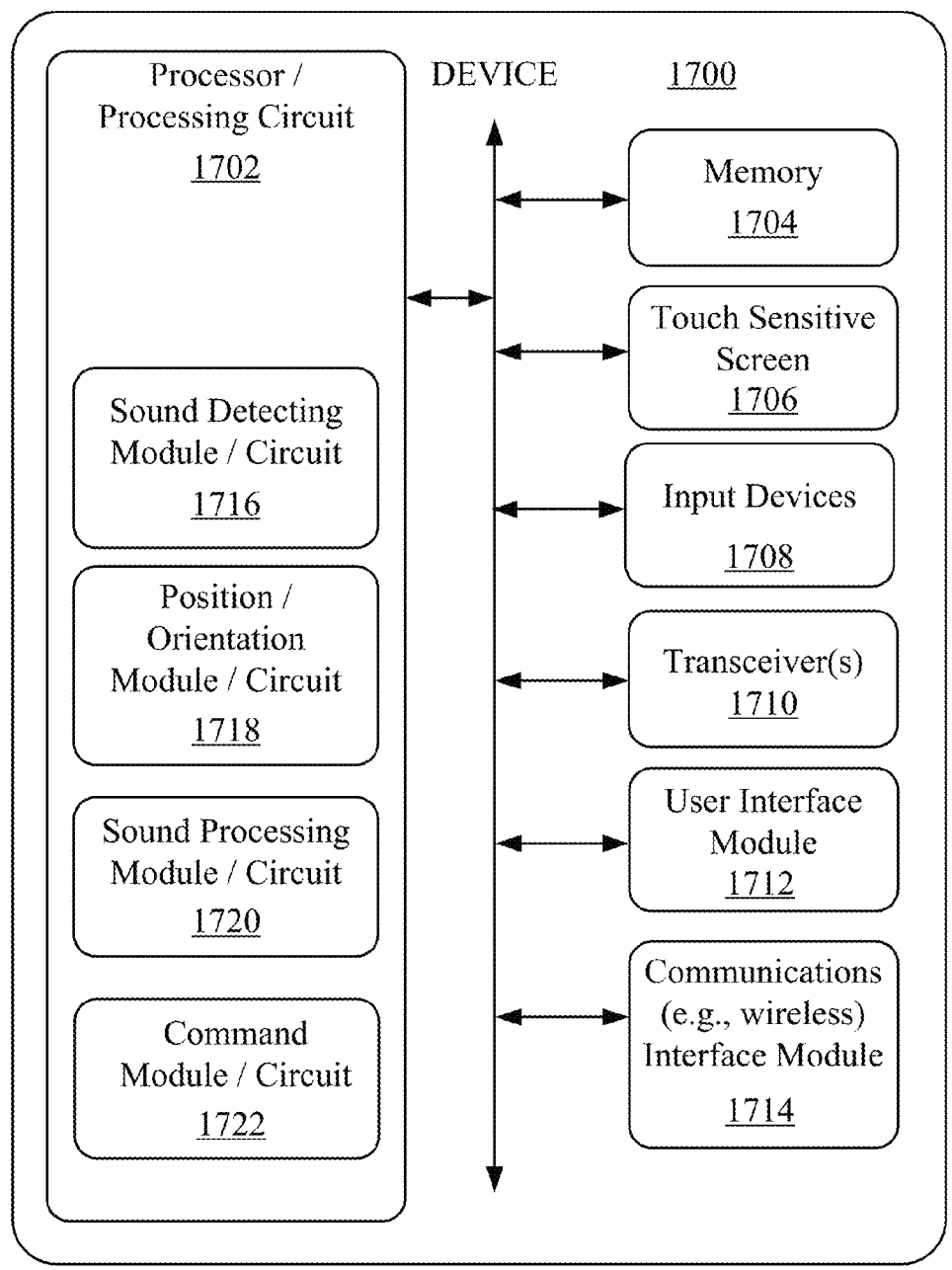
FIG. 17 illustrates an example of a device that some implementations may use.

FIG. 17 illustrates an example of a device that some implementations may use. As shown in FIG. 17, the device 1700 may include at least one processor/processing circuit 1702, a memory 1704, a touch sensitive screen 1706, several input devices 1708, at least one transceiver 1710, at least one user interface module 1712, and at least one communications interface module 1714.

The touch sensitive screen 1706 may be used to display a graphical representation of a sound field in a physical space. The touch sensitive screen 1706 may also be used to receive input from one or more users. The input devices 1708 allow a user to input data and/or provide control of the device. The transceiver 1710 allows the device to transmit and receive wireless signals from other devices (e.g., phone, computer, tablet, sound transducer array). The device may include multiple transceivers, which allows the sound transducer array to communicate (e.g., wirelessly) with different devices using different communications links and different communication protocols. In some implementations, the user interface module 1712 provides an interface between the touch sensitive screen 1706, input devices 1708 and the processor/processing circuit 1702. The user interface module 1712 may include several user interface modules (e.g., a module for each component). In some implementations, the communications interface module 1714 provides an interface between the transceiver 1710 and the processor/processing circuit 1702. The communications interface module 1714 may include several interface modules (e.g., a module for each transceiver).

As shown in FIG. 17, the processor/processing circuit 1702 may include a sound detecting module/circuit 1716 for interfacing with a sound transducer array, position/orientation module/circuit 1718 for determining the position of the sound transducer array, a sound processing module/circuit 1720, and a command module/circuit 1722.

The sound detecting module/circuit 1716 may be for interfacing with the sound transducer array. The position/orientation module/circuit 1718 may be for determining the position and/or orientation of the sound transducer array in some implementations. The sound processing module/circuit 1720 may be for processing sound captured by microphones in some implementations. The microphones may be microphones from a sound transducer array coupled to device. The processing of sound may include extracting individual sound from the captured sound. The processing of sound may also include identifying the identity of speakers in some implementations. The command module/circuit 1722 may be for processing control information based on multi-touch gestures to re-direct the sound field of the array.

Figure 18:
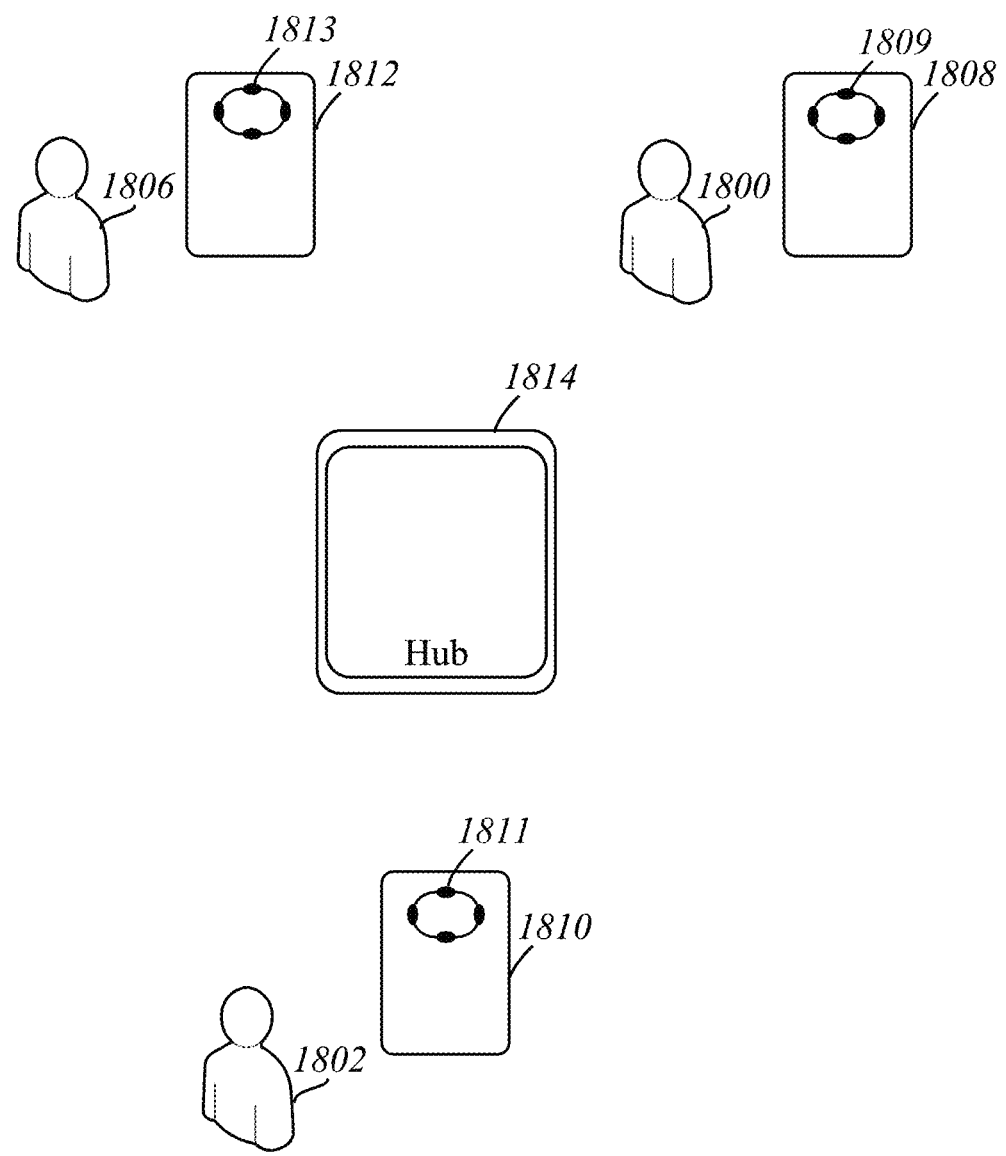
FIG. 18 illustrates a system for representing and controlling a sound field in a physical space utilizing one or more tablets, according to one embodiment.

FIG. 18 illustrates a system for representing and controlling a sound field in a physical space utilizing one or more tablets, according to one embodiment. As shown in FIG. 18, three individuals 1800-1806 may each have a tablet 1808-1812 that can communicate directly with each other or with a hub 1814. Each tablet may have its own sound transducer array (i.e. microphones and speakers) 1809-1813 that may be located internally within each table or externally on each tablet.

Figure 19A:
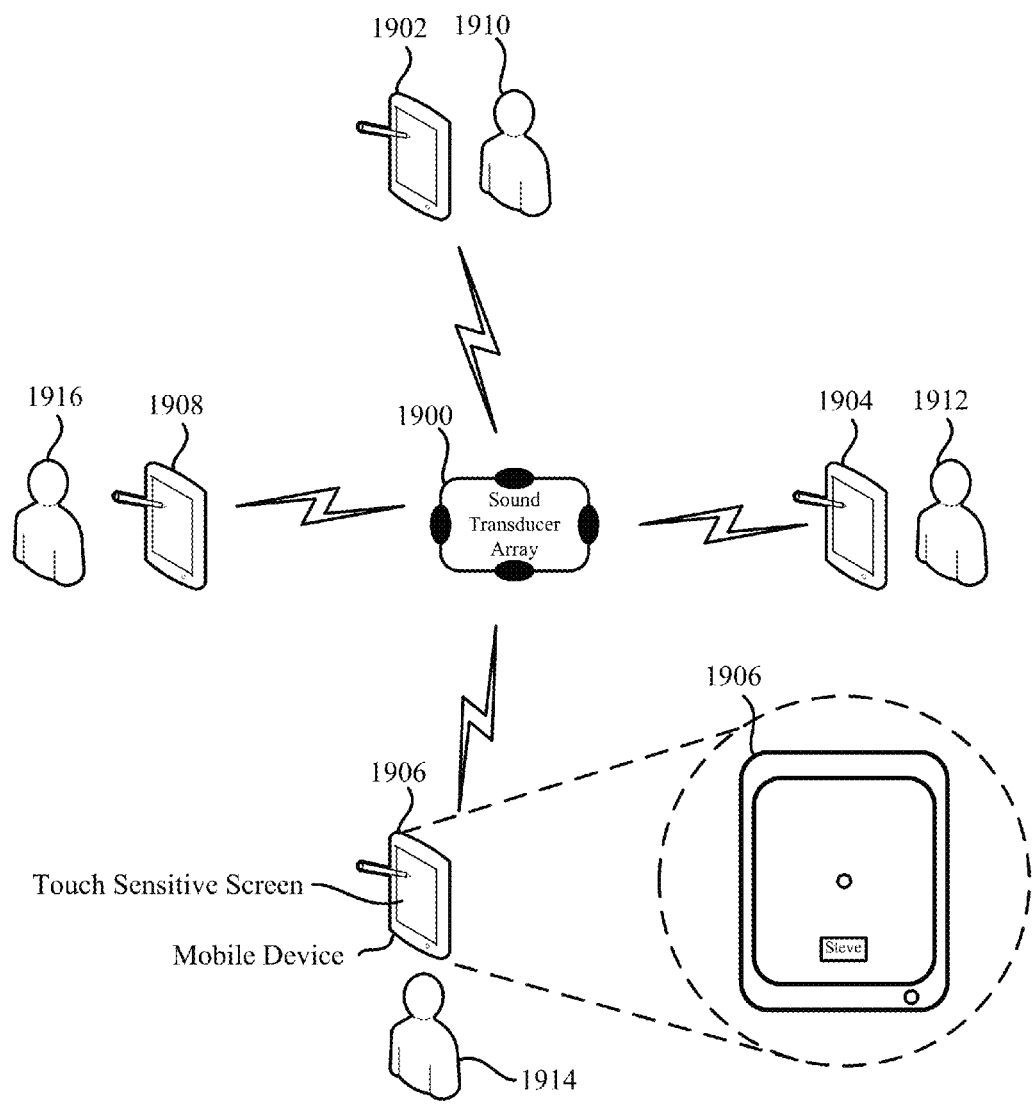
FIG. 19A illustrates a system that includes a sound transducer array and several devices.

FIG. 19A illustrates another configuration that may be implemented using additional devices. As shown in FIG. 19A, a sound transducer array 1900 is in communication with several mobile devices 1902-1908 (e.g., handset, tablet). Each of these mobile devices may be associated with a respective user/person 1910-1916. A mobile device may be a handset, a tablet, a phone, a smart phone, a portable electronic device, an electronic notepad, and/or a personal digital assistant (PDA). The mobile device may be able to communicate with other devices via a cellular network and/or other communication networks.

The mobile devices 1902-1908 may allow a user to "check in" and/or register with the sound transducer array 1900. (e.g., check in using NFC by tapping the mobile device near the microphone array 1900). However, different implementations may "check-in" and/or register with the sound transducer array 1900 differently. For example, a mobile device may use another communication protocol or communication link (e.g., Bluetooth, WiFi) to communicate with the sound transducer array 1900. Once the user/mobile device is "checked-in" or is registered, the mobile device may be tracked by the sound transducer array using ultrasonic/infrared/sonic pulses (or other known tags), which allows the sound transducer array 1900 to continuously know the position/location of the mobile device, which consequently means the sound transducer array 1900 knows the position/location of the user associated with the mobile device being tracked.

Each mobile device 1902-1908 may provide a graphical user interface on its respective screen that allows a user to specify the position/location of the user and/or device (e.g., tablet) relative to the sound transducer array 1900. That is, a user may indicate on the mobile device's screen the user's position which is then transmitted (e.g., via Bluetooth, WiFi) to the sound transducer array 1900 and/or another device (e.g., device 1001). The graphical user interface on the screen of the mobile device (e.g., mobile devices 1902-1908) may also provide/display text (e.g., transcribed captured voice). Such text may be provided/transmitted from the sound transducer array 1900 and/or another device in communication with the sound transducer array 1900.

The sound transducer array 1900 may be located on a table (not shown) or a touch sensitive screen (not shown) of a device included within a table. Similarly, the mobile devices 1902-1908 may be positioned on the table or a touch sensitive screen of a device included within a table.

Figure 19B:
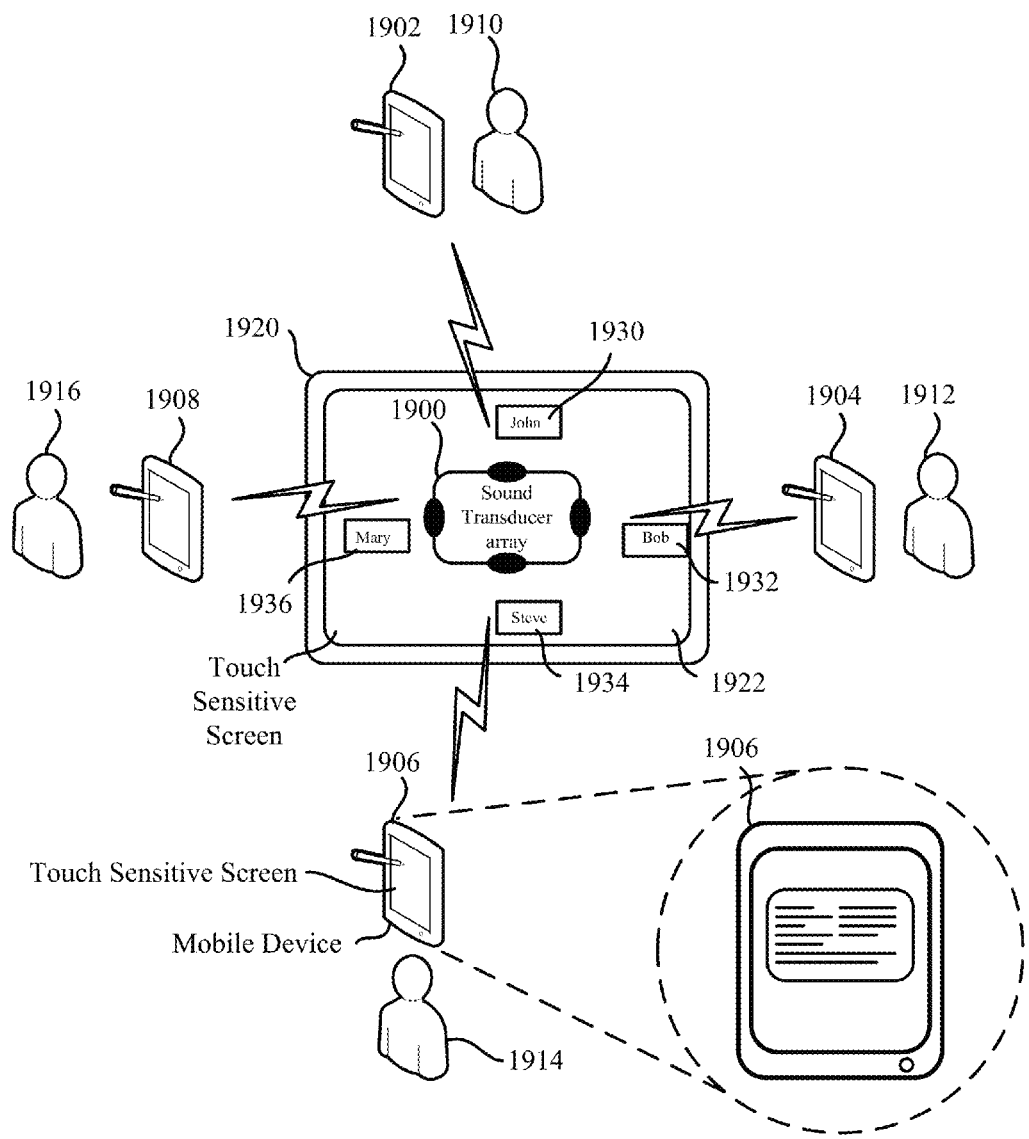
FIG. 19B illustrates another system that includes a sound transducer array and several devices.

FIG. 19B illustrates another configuration that may be implemented using a different device. FIG. 19B is similar to FIG. 19A except that the sound transducer array 1900 is located on a touch sensitive screen 1922 of a device 1920 and the position of the users is specified on the graphical user interface of the touch sensitive screen 1922 of the device 1920. As shown in FIG. 19B, the mobile devices 1902-1908 (e.g., handset, tablet) are in communication (e.g., using Bluetooth, WiFi) with the sound transducer array 1900 and/or device 1920.

As further shown in FIG. 19B, users specify their positions relative to the sound transducer array 1900 by specifying the position/location of graphical user interface elements. As shown in FIG. 19B, there are four graphical user interface elements 1930-1936 displayed on the graphical user interface shown in the screen 1922. Each graphical user interface element 1930-1936 may be associated with a particular user and/or mobile device. The graphical user interface element may include a text or image (e.g., ID, name, picture) identifying the user that the user interface element is associated with. Different implementations may present the graphical user interface elements differently. In some implementations, a graphical user interface element is presented with the user taps the screen and/or logs in. In some implementations, the graphical user interface element may be presented when the user "check-in" and/or registers with the sound transducer array 1900 and/or device 1920 using one of the exemplary methods described above in FIG. 19A (e.g., checking in using NFC by tapping the sound transducer array 1900 and/or device 1920). Since the mobile devices 1902-1908 are in communication with the sound transducer array 1900 and/or device 1920, the mobile devices 1902-1908 may receive data from either or both the sound transducer array 1900 and device 1920. Such data may be presented/displayed on the screen of the mobile devices 1902-1908. Examples of data include transcribed text of captured voice in some implementations.

Figure 19C:
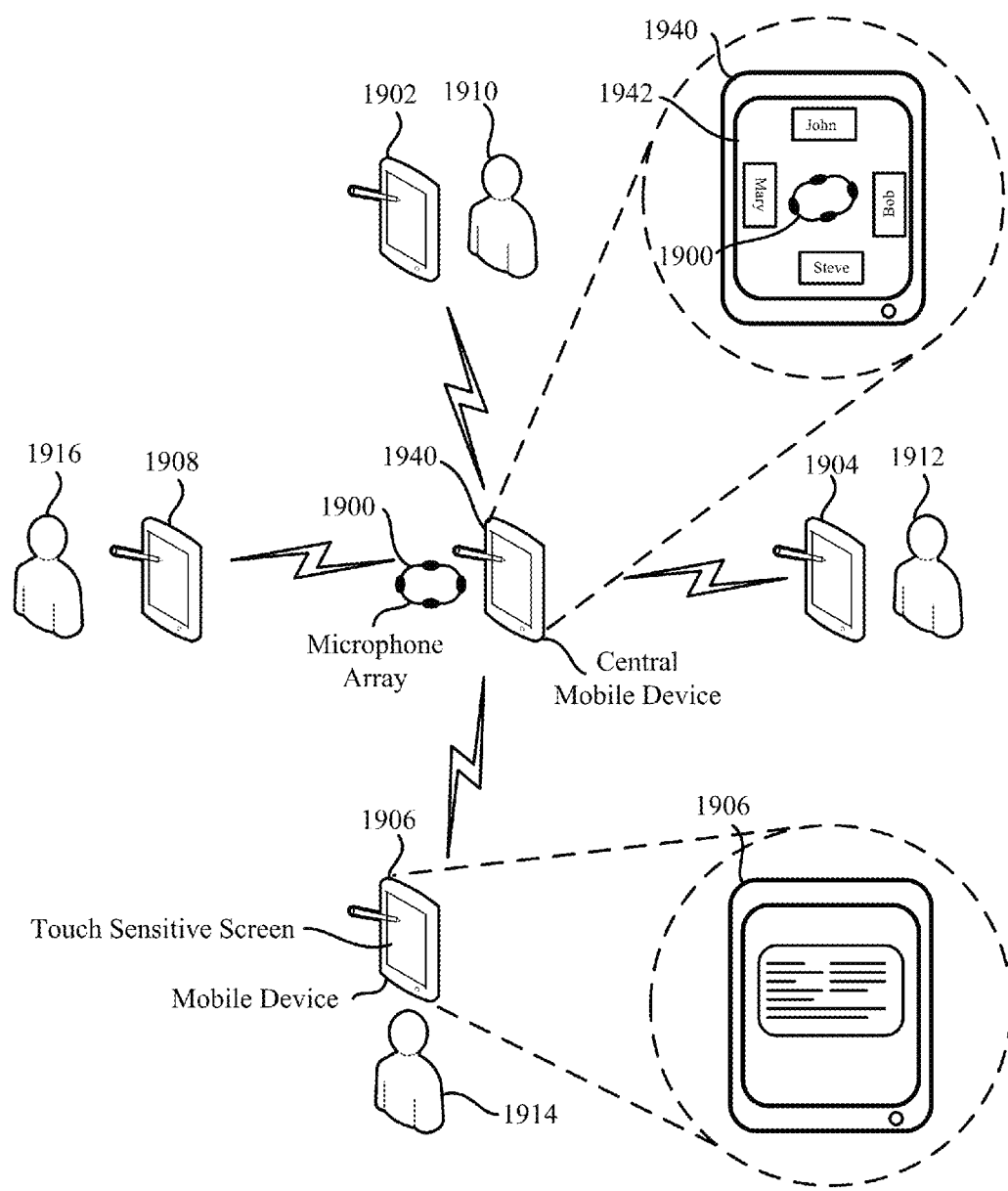
FIG. 19C illustrates another system that includes a sound transducer array, a central mobile device and several devices.

In some implementations, the device 1920 is a mobile device (e.g., tablet, handset). This may be possible when the screen size of the mobile device is sufficiently large enough for the sound transducer array 1900 to be positioned on the screen of the mobile device. In such instances, the mobile device may serve as a central mobile device (e.g., central tablet) on which the sound transducer array 1900 is positioned on. FIG. 19C illustrates an example of a configuration that include a central mobile device (e.g., central tablet). As shown in FIG. 19C, the mobile devices 1902-1908 (e.g., handset, tablet) are in communication (e.g., using Bluetooth, WiFi) with the sound transducer array 1900 and/or central mobile device 1940. The central mobile device 1940 includes a touch sensitive screen 1942, on which the sound transducer array 1900 may be placed on. It should be noted that any of the mobile devices 1902-1908 may function as a central mobile device in some implementations.

The configuration of FIG. 19C is similar to the configuration of FIG. 19B, except that device 1920 (which may be a surface table/surface tablet) of FIG. 19B has been replaced with a mobile device 1940 (e.g., tablet, smart phone), which functions as a central mobile device in communication with other mobile devices (e.g., mobile devices 1902-1908). In some implementations, the operation of the configuration shown in FIG. 19C is similar to the operation of the configurations shown and described in FIGS. 19A-19B. That is, for example, in some implementations, users may "check-in", register and/or log in with the sound transducer array 1900 and/or the central mobile device 1940 using NFC or other communication protocols/links (e.g., Bluetooth, WiFi).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, the substrate of the die may be coupled to the packaging substrate even though the substrate of the die is never directly physically in contact with the packaging substrate.

One or more of the components, steps, features, and/or functions illustrated in FIGS. 1, 2, 3, 4, 5, 6, 7, 8, 9, 10, 11, 12, 13, 14, 15, 16, 17, 18 and/or 19 may be rearranged and/or combined into a single component, step, feature or function or embodied in several components, steps, or functions. Additional elements, components, steps, and/or functions may also be added without departing from the invention.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of controlling a sound field, the method comprising:
   displaying, on a physical space, a graphical representation of one or more sound projection patterns associated with a sound transducer array, wherein the sound transducer array is in communication with the physical space, and wherein the sound projection patterns comprise a physical wave field;
   detecting at least one command directed at the graphical representation of the one or more sound projection patterns via the physical space;
   modifying the one or more sound projection patterns of the sound transducer array based on the at least one command; and
   updating the graphical representation of the one or more sound projection patterns displayed on the physical space based at least in part on the modified one or more sound projection patterns.

2. The method of claim 1, wherein the displaying of the one or more sound projection patterns comprises generating the graphical representation of the one or more sound projection patterns based on a characteristic of the one or more sound projection patterns.

3. The method of claim 2, wherein the characteristic comprises at least one of a beam width, a direction, an origin, a frequency range, a signal-to-noise ratio, and a type of generator or receiver of the one or more sound projection patterns.

4. The method of claim 2, wherein the graphical representation comprises a scale proportional to the characteristic of the one or more sound projection patterns.

5. The method of claim 4, wherein the scale comprises a one-to-one correspondence with the characteristic of the at least one sound projection pattern.

6. The method claim 1, wherein the graphical representation comprises a color scheme assigned to each of the one or more sound projection patterns.

7. The method of claim 6, wherein the color scheme comprises a mapping of the characteristic to a color space.

8. The method of claim 1, further comprising:
   determining a location of the sound transducer array with respect to the physical space; and
   generating an origin of the graphical representation based on the location.

9. The method of claim 1, further comprising:
   determining an orientation of the sound transducer array relative to the physical space; and
   generating an orientation vector as a reference on the graphical representation based on the orientation.

10. The method of claim 1, wherein the sound transducer array comprises a microphone array for capturing sound and the one or more sound projection patterns are associated with sound pickup of the microphone array.

11. The method of claim 1, wherein the sound transducer array comprises multiple microphones.

12. The method of claim 11, wherein the multiple microphones are located in a vehicle.

13. The method of claim 1, wherein the sound transducer array comprises multiple speakers.

14. The method of claim 13, wherein the multiple speakers are located in a vehicle.

15. The method of claim 1, wherein detecting the at least one command comprises:
- detecting an interaction of a user with the physical space; and
- decoding the interaction to determine a desired operation by the user.

16. The method of claim 15, wherein the desired operation comprises concealing the graphical representation of the one or more sound projection patterns.

17. The method of claim 15, further comprising displaying a user interface on the physical space to allow the user to select the desired operation.

18. The method of claim 15, wherein the desired operation comprises selecting the one or more sound projection patterns for application of a second operation thereto.

19. The method of claim 15, wherein the desired operation comprises creating one or more virtual groupings of the one or more sound projection patterns.

20. The method of claim 19, wherein the graphical representation comprises an illustration of the one or more virtual groupings.

21. The method of claim 20, wherein the illustration comprises one or more virtual layers, wherein each of the one or more virtual groupings corresponds to at least one of the one or more virtual layers.

22. The method of claim 15, further comprising:
- decoding a second interaction of the user with the physical space; and
- decoding a second desired operation by the user, wherein the second desired operation is applied to the one or more virtual groupings.

23. The method of claim 1, wherein the physical space comprises at least one of a touch-sensing surface, a display screen and a tablet display.

24. The method of claim 1,
- wherein the at least one command is a gesture, and
- wherein the gesture comprises at least one of multiple tapping, drawing one or more circles around the one or more sound projection patterns and grouping multiple sound projection patterns of the one or more sound projection patterns together for manipulating as a group.

25. A sound transducer array in communication with a physical space, the sound transducer array comprising:
- a speaker array;
- a microphone array, in communication with the speaker array, for capturing sound;
- at least one processor in communication with the microphone array and configured to:
  - display, on the physical space, a graphical representation of one or more sound projection patterns associated with a sound transducer array, wherein the sound transducer array is in communication with the physical space, and wherein the sound projection patterns comprise a physical wave field;
  - detect at least one command directed at the graphical representation of the one or more sound projection patterns via the physical space;
  - modify the one or more sound projection patterns of the sound transducer array based on the at least one command; and
  - update the graphical representation of the one or more sound projection patterns displayed on the physical space based at least in part on the modified one or more sound projection patterns.

26. The sound transducer array of claim 25, wherein the at least one processor, for the displaying of the one or more sound projection patterns, is further configured to generate the graphical representation of the one or more sound projection patterns based on a characteristic of the one or more sound projection patterns.

27. The sound transducer array of claim 26, wherein the characteristic comprises at least one of a beam width, a direction, an origin, a frequency range, a signal-to-noise ratio, and a type of generator or receiver of the one or more sound projection patterns.

28. The sound transducer array of claim 26, wherein the graphical representation comprises a scale proportional to the characteristic of the one or more sound projection patterns.

29. The sound transducer array of claim 26, wherein the scale comprises a one-to-one correspondence with the characteristic of the at least one sound projection pattern.

30. The sound transducer array claim 26, wherein the graphical representation comprises a color scheme assigned to each of the one or more sound projection patterns.

31. The sound transducer array of claim 30, wherein the color scheme comprises a mapping of the characteristic to a color space.

32. The sound transducer array of claim 25, wherein the at least one processor is further configured to:
- determine a location of the sound transducer array with respect to the physical space; and
- generate an origin of the graphical representation based on the location.

33. The sound transducer array of claim 25, wherein the at least one processor is further configured to:
- determine an orientation of the sound transducer array relative to the physical space; and
- generate an orientation vector as a reference on the graphical representation based on the orientation.

34. The sound transducer array of claim 33, wherein the one or more sound projection patterns are associated with sound pickup of the microphone array.

35. The sound transducer array of claim 25, wherein the sound transducer array comprises multiple microphones.

36. The sound transducer array of claim 25, wherein the sound transducer array comprises multiple speakers.

37. The sound transducer array of claim 25, wherein the at least one processor, for detecting the at least one command, is further configured to:
- detect an interaction of a user with the physical space; and
- decode the interaction to determine a desired operation by the user.

38. The sound transducer array of claim 37, wherein the desired operation comprises concealing the graphical representation of the one or more sound projection patterns.

39. The sound transducer array of claim 37, wherein the at least one processor is further configured to display a user interface on the physical space to allow the user to select the desired operation.

40. The sound transducer array of claim 37, wherein the desired operation comprises selecting the one or more sound projection patterns for application of a second operation thereto.

41. The sound transducer array of claim 37, wherein the desired operation comprises creating one or more virtual groupings of the one or more sound projection patterns.

42. The sound transducer array of claim 41, wherein the graphical representation comprises an illustration of the one or more virtual groupings.

43. The sound transducer array of claim 41, wherein the illustration comprises one or more virtual layers, wherein each of the one or more virtual groupings corresponds to at least one of the one or more virtual layers.

44. The sound transducer array of claim 37, wherein the at least one processor is further configured to:
- decode a second interaction of the user with the physical space; and
- decode a second desired operation by the user, wherein the second desired operation is applied to the one or more virtual groupings.

45. The sound transducer array of claim 25, wherein the physical space comprises at least one of a touch-sensing surface, a display screen and a tablet display.

46. The sound transducer array of claim 25,
wherein the at least one command is a gesture, and
wherein the gesture comprises at least one of multiple tapping, drawing one or more circles around the one or more sound projection patterns and grouping multiple sound projection patterns of the one or more sound projection patterns together for manipulating as a group.

47. A sound transducer array in communication with a physical space, the sound transducer array comprising:
- means for displaying, on a physical space, a graphical representation of one or more sound projection patterns associated with a sound transducer array, wherein the sound transducer array is in communication with the physical space, and wherein the sound projection patterns comprise a physical wave field;
- means for detecting at least one command directed at the graphical representation of the one or more sound projection patterns via the physical space;
- means for modifying the one or more sound projection patterns of the sound transducer array based on the at least one command; and
- means for updating the graphical representation of the one or more sound projection patterns displayed on the physical space based at least in part on the modified one or more sound projection patterns.

48. The sound transducer array of claim 47, wherein the means for displaying comprises means for generating the graphical representation of the one or more sound projection patterns based on a characteristic of the one or more sound projection patterns.

49. The sound transducer array of claim 47, further comprising:
- means for determining a location of the sound transducer array with respect to the physical space; and
- means for generating an origin of the graphical representation based on the location.

50. The sound transducer array of claim 47, further comprising:
- means for determining an orientation of the sound transducer array relative to the physical space; and
- means for generating an orientation vector as a reference on the graphical representation based on the orientation.

51. The sound transducer array of claim 47, wherein the sound transducer array comprises multiple microphones.

52. The sound transducer array of claim 47, wherein the sound transducer array comprises multiple speakers.

53. The sound transducer array of 47, wherein the means for detecting the at least one command comprises:
- means for detecting an interaction of a user with the physical space; and
- means for decoding the interaction to determine a desired operation by the user.

54. The sound transducer array of claim 53, wherein the desired operation comprises concealing the graphical representation of the one or more sound projection patterns.

55. The sound transducer array of claim 53, further comprising means for displaying a user interface on the physical space to allow the user to select the desired operation.

56. The sound transducer array of claim 53, wherein the desired operation comprises selecting the one or more sound projection patterns for application of a second operation thereto.

57. The sound transducer array of claim 56, further comprising:
- means for decoding a second interaction of the user with the physical space; and
- means for decoding a second desired operation by the user, wherein the second desired operation is applied to the one or more virtual groupings.

58. The sound transducer array of claim 47,
wherein the at least one command is a gesture, and
wherein the gesture comprises at least one of multiple tapping, drawing one or more circles around the one or more sound projection patterns and grouping multiple sound projection patterns of the one or more sound projection patterns together for manipulating as a group.

59. A non-transitory computer readable storage medium comprising one or more instructions for controlling a sound field, which when executed by at least one processor, causes the at least one processor to:
- display, on a physical space, a graphical representation of one or more sound projection patterns associated with a sound transducer array, wherein the sound transducer array is in communication with the physical space, and wherein the sound projection patterns comprise a physical wave field;
- detect at least one command directed at the graphical representation of the one or more sound projection patterns via the physical space;
- modify the one or more sound projection patterns of the sound transducer array based on the at least one command; and
- update the graphical representation of the one or more sound projection patterns displayed on the physical space based at least in part on the modified one or more sound projection patterns.

60. The non-transitory computer readable storage medium of claim 59, further comprising one or more instructions which when executed by at least one processor, causes the at least one processor to generate the graphical representation of the one or more sound projection patterns based on a characteristic of the one or more sound projection patterns when displaying of the one or more sound projection patterns.

61. The non-transitory computer readable storage medium of claim 59, further comprising one or more instructions which when executed by at least one processor, causes the at least one processor to:
- determine a location of the sound transducer array relative to the physical space; and
- generate an origin of the graphical representation based on the location.

62. The non-transitory computer readable storage medium of claim 59, further comprising one or more instructions which when executed by at least one processor, causes the at least one processor to:
- determine an orientation of the sound transducer array with respective to the physical space; and
- generate an orientation vector as a reference on the graphical representation based on the orientation.

63. The non-transitory computer readable storage medium of claim 59, wherein the sound transducer array comprises multiple microphones.

64. The non-transitory computer readable storage medium of claim 59, wherein the sound transducer array comprises multiple speakers.

65. The non-transitory computer readable storage medium of claim 59, wherein the instructions that cause, when execute, the at least one processor to detect the at least one command further comprises instructions that, when executed cause the at least one processor to:
   detect an interaction of a user with the physical space; and
   decode the interaction to determine a desired operation by the user.

66. The non-transitory computer readable storage medium of claim 65, wherein the desired operation comprises selecting the one or more sound projection patterns for application of a second operation thereto.

67. The non-transitory computer readable storage medium of claim 66, further comprising one or more instructions which when executed by at least one processor, causes the at least one processor to:
   decode a second interaction of the user with the physical space; and
   decode a second desired operation by the user, wherein the second desired operation is applied to the one or more virtual groupings.

68. The non-transitory computer readable storage medium of claim 59,
   wherein the at least one command is a gesture, and
   wherein the gesture comprises at least one of multiple tapping, drawing one or more circles around the one or more sound projection patterns and grouping multiple sound projection patterns of the one or more sound projection patterns together for manipulating as a group.

* * * * *